(12) United States Patent
Jung et al.

(10) Patent No.: US 9,237,468 B2
(45) Date of Patent: Jan. 12, 2016

(54) METHOD FOR LOGGING AND REPORTING INFORMATION ON INTERFERENCE BY IDC TERMINAL IN WIRELESS COMMUNICATION SYSTEM AND DEVICE FOR SUPPORTING SAME

(75) Inventors: Sung Hoon Jung, Anyang-si (KR); Seung June Yi, Anyang-si (KR); Young Dae Lee, Anyang-si (KR); Sung Jun Park, Anyang-si (KR); Jae Wook Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 14/114,503

(22) PCT Filed: Apr. 26, 2012

(86) PCT No.: PCT/KR2012/003264
§ 371 (c)(1),
(2), (4) Date: Oct. 28, 2013

(87) PCT Pub. No.: WO2012/148204
PCT Pub. Date: Nov. 1, 2012

(65) Prior Publication Data
US 2014/0056169 A1 Feb. 27, 2014

Related U.S. Application Data

(60) Provisional application No. 61/479,835, filed on Apr. 27, 2011.

(51) Int. Cl.
*H04W 24/08* (2009.01)
*H04W 24/10* (2009.01)
(52) U.S. Cl.
CPC .............. *H04W 24/08* (2013.01); *H04W 24/10* (2013.01)

(58) Field of Classification Search
None
See application file for complete search history.

(56) References Cited

U.S. PATENT DOCUMENTS 6,295,453 B1 * 9/2001 Desgagne et al. ............ 455/448
7,197,303 B2 * 3/2007 Sakai ............................ 455/423
(Continued)

FOREIGN PATENT DOCUMENTS

| KR | 10-2008-0085019 | 9/2008 |
| KR | 10-2010-0100642 | 9/2010 |
| WO | 2012/021879 | 2/2012 |

OTHER PUBLICATIONS

ZTE, "Discussion on the trigger for indication," 3GPP TSG-RAN WG2 Meeting #73bis, R2-111914, Apr. 2011, 3 pages.
(Continued)

*Primary Examiner* — Chi H Pham
*Assistant Examiner* — Shick Hom
(74) *Attorney, Agent, or Firm* — Lee, Hong, Degerman, Kang & Waimey

(57) ABSTRACT

A method for logging and reporting IDC interference information is provided. The method includes receiving an IDC interference measurement configuration from a network, the IDC interference measurement configuration comprising information instructing that a logging of IDC interference information be started, performing first IDC interference measurement on a first subframe, logging first IDC interference information comprising a first IDC interference measurement result, performing second IDC interference measurement on a second subframe, logging second IDC interference information comprising a second IDC interference measurement result, and reporting the first IDC interference information and the second IDC interference information to the network.

15 Claims, 22 Drawing Sheets

(56) References Cited

U.S. PATENT DOCUMENTS

| | | | |
|---|---|---|---|
| 2005/0058181 A1* | 3/2005 | Lyle et al. | 375/133 |
| 2009/0225717 A1* | 9/2009 | Banerjea | 370/329 |
| 2010/0067469 A1* | 3/2010 | Gaal et al. | 370/329 |
| 2011/0250880 A1 | 10/2011 | Olsson | |
| 2013/0137435 A1* | 5/2013 | Shi | 455/436 |

OTHER PUBLICATIONS

3rd Generation Partnership Project (3GPP), "Technical Specification Group Radio Access Networks; Evolved Universal Terrestrial Radio Access (E-UTRA); Study on signalling and procedure for interference avoidance for in-device coexistence; (Release 10)," 3GPP TR 36.816 v1.2.0, Mar. 2011, 39 pages.

Korean Intellectual Property Office Application Serial No. 10-2013-7029200, Office Action dated Dec. 24, 2014, 4 pages.

Nokia Siemens Networks, et al., "IDC Considerations for MDT," 3GPP TSG-RAN WG2 Meeting #77bis, R2-121095, XP050606144, Mar. 2012, 4 pages.

European Patent Office Application Serial No. 12777304.2, Search Report dated Apr. 2, 2015, 8 pages.

* cited by examiner

METHOD FOR LOGGING AND REPORTING INFORMATION ON INTERFERENCE BY IDC TERMINAL IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2012/003264, filed on Apr. 26, 2012, which claims the benefit of U.S. Provisional Application Ser. No. 61/479,835, filed on Apr. 27, 2011, the contents of which are hereby incorporated by reference herein in their entirety.

TECHNICAL FIELD

The present invention relates to wireless communication and, more particularly, to a method for logging In-Device Coexistence (IDC) interference information about IDC UE and reporting the log and an apparatus supporting the same.

BACKGROUND ART

3$^{rd}$ Generation Partnership Project (3GPP) Long Term Evolution (LTE), that is, the improvement of an LTE Universal Mobile Telecommunications System (UMTS), has been introduced as 3GPP release 8. 3GPP LTE uses Orthogonal Frequency Division Multiple Access (OFDMA) in downlink and uses Single Carrier-Frequency Division Multiple Access (SC-FDMA) in uplink. 3GPP LTE adopts Multiple Input Multiple Output (MIMO) having a maximum of 4 antennas. Recently, 3GPP LTE-Advanced (LTE-A), that is, the evolution of 3GPP LTE, is being discussed.

A Minimization Drive Test (MDT) is that service providers perform a test using UE instead of a vehicle for coverage optimization. Coverage varies depending on the location of a BS, the deployment of peripheral buildings, and a user use environment. Accordingly, a service provider needs to periodically perform a driving test, and lots of costs and resources are consumed. An MDT is that a service provider measures coverage using UE.

An MDT can be divided into a logged MDT and an immediate MDT. In accordance with the logged MDT, UE performs MDT measurement and then transfers logged measurement to a network at a specific point of time. In accordance with the immediate MDT, UE performs MDT measurement and then transfers measurement to a network when a report condition is satisfied. In the logged MDT, MDT measurement is performed in an RRC idle mode, whereas in the immediate MDT, MDT measurement is performed in an RRC connected mode.

A service provider can write a coverage map, indicating whether or not service is possible over the entire area to which service is provided by a service provider and a distribution of QoS, by synthesizing pieces of MDT measurement received from several pieces of UE and use the written coverage map in network operations and optimization. For example, when a report on a coverage problem for a specific area is received from UE, a service provider can enlarge the coverage of a corresponding area cell by increasing the transmission power of a BS that provides service to the corresponding area.

Meanwhile, a recent UE device supports other wireless communication techniques, such as a WLAN (Wi-Fi), WiMAX, Zigbee, Bluetooth and/or a Global Navigation Satellite System (GNSS) as well as a wireless communication system, such as LTE. If such UE is In-Device Coexistence (IDC) UE, the transmission and reception of radio signals by another wireless communication can generate interference with the transmission and reception of LTE radio signals and vice versa. This may result in a problem in that quality of service provided to UE is deteriorated and efficiency of radio resources is also deteriorated.

Meanwhile, a network can make IDC interference avoided by controlling the operation of UE if it can obtain information about IDC interference within the UE. Accordingly, there is a need for a method for logging IDC interference information about IDC UE and reporting the logged IDC interference information to a network.

DISCLOSURE

Technical Problem

An object of the present invention is to provide a method for logging In-Device Coexistence (IDC) interference information about IDC UE and reporting the log and an apparatus supporting the same.

Technical Solution

In an aspect, a wireless apparatus is provided. The wireless apparatus includes a first Radio Frequency (RF) unit transmitting and receiving radio signals according to a first wireless communication system, a second RF unit transmitting and receiving radio signals according to a second wireless communication system, and a processor operably coupled to the first RF unit. The processor is configured to receive an In-Device Coexistence (IDC) interference measurement configuration from a network, wherein the IDC interference measurement configuration comprises information instructing that a logging of IDC interference information be started, perform first IDC interference measurement on a first subframe, log first IDC interference information comprising a first IDC interference measurement result, perform second IDC interference measurement on a second subframe, log second IDC interference information comprising a second IDC interference measurement result, and report the first IDC interference information and the second IDC interference information to the network.

The IDC interference measurement configuration may further include information indicative of a log report type.

If the log report type indicates a non-real-time log report type, the first IDC interference information and the second IDC interference information may be together reported to the network after a specific point of time.

The IDC interference measurement configuration may further include logging interval indication information indicative of the specific point of time.

The reporting the first IDC interference information and the second IDC interference information to the network may include receiving a log report request from the network, and sending the first IDC interference information and the second IDC interference information to the network in response to the log report request.

If the log report type indicates a real-time log report type, the first IDC interference information and the second IDC interference information may be individually logged and individually reported to the network.

The first IDC interference information may further include information about timing of the first IDC interference measurement.

The information about the timing of the first IDC interference measurement may be timing information of a subframe unit.

The first RF unit and the processor may support Long Term Evolution (LTE) wireless communication.

The second RF unit may support at least one of WLAN (Wi-Fi), WiMAX, Zigbee, and Bluetooth wireless communications.

In another aspect, a method for logging and reporting In-Device Coexistence (IDC) interference information, performed by IDC UE, in a wireless communication system is provided. The method includes receiving an In-Device Coexistence (IDC) interference measurement configuration from a network, the IDC interference measurement configuration comprising information instructing that a logging of IDC interference information be started, performing first IDC interference measurement on a first subframe, logging first IDC interference information comprising a first IDC interference measurement result, performing second IDC interference measurement on a second subframe, logging second IDC interference information comprising a second IDC interference measurement result, and reporting the first IDC interference information and the second IDC interference information to the network.

The IDC interference measurement configuration may further include information indicative of a log report type.

If the log report type indicates a non-real-time log report type, the first IDC interference information and the second IDC interference information may be together reported to the network after a specific point of time.

The IDC interference measurement configuration may further include logging interval indication information indicative of the specific point of time.

The step of reporting the first IDC interference information and the second IDC interference information to the network may include receiving a log report request from the network, and sending the first IDC interference information and the second IDC interference information to the network in response to the log report request.

If the log report type indicates a real-time log report type, the first IDC interference information and the second IDC interference information may be individually logged and individually reported to the network.

The first IDC interference information may further include information about timing of the first IDC interference measurement.

Advantageous Effects

UE can effectively log an in-device interference situation and an operation situation over a network and report the logged in-device interference and operation situations to the network. The network can perform a configuration for minimizing the in-device interference of the UE on the UE because the network can obtain information about the pattern of a subframe in which interference can be generated by analyzing the log. Accordingly, service efficiency and radio resource efficiency of IDC UE can be improved.

MODE FOR INVENTION

Figure 1:
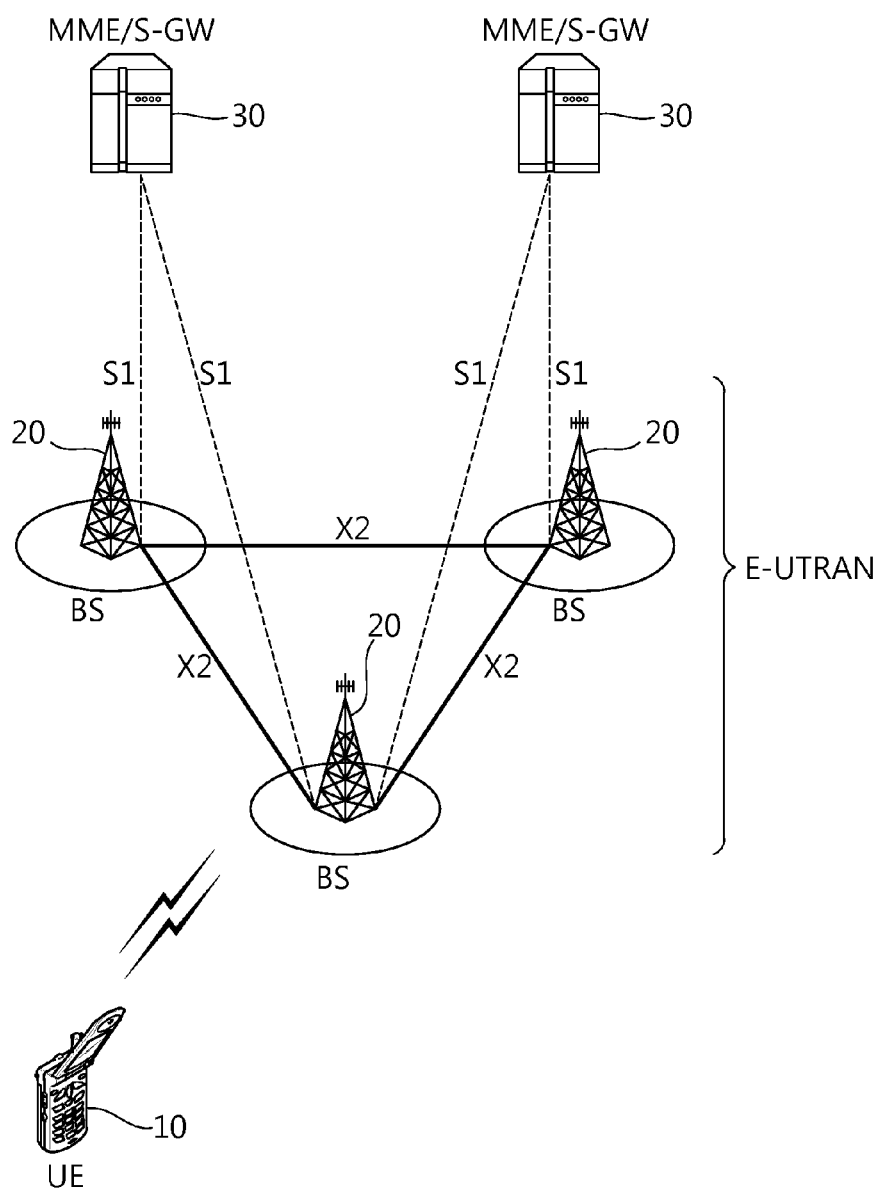
FIG. 1 shows a wireless communication system to which the present invention is applied.

FIG. 1 shows a wireless communication system to which the present invention is applied. The wireless communication system may also be called an Evolved-UMTS Terrestrial Radio Access Network (E-UTRAN) or a Long Term Evolution (LTE)/LTE-A system.

The E-UTRAN includes a Base Station (BS) 20 which provides User Equipment (UE) 10 with a control plane and a user plane. The UE 10 may be fixed or may have mobility. The UE 10 may be called another term, such as a Mobile Station (MS), a User Terminal (UT), a Subscriber Station (SS), a Mobile Terminal (MT), or a wireless device. The BS 20 refers to a fixed station communicating with the UE 10 and may be called another term, such as an evolved-NodeB (eNB), a Base Transceiver System (BTS), or an access point.

The BSs 20 may be interconnected through an X2 interface. The BS 20 is connected to an Evolved Packet Core (EPC) 30 through an S1 interface, more particularly, to a Mobility Management Entity (MME) through an S1-MME and a Serving Gateway (S-GW) through an S1-U.

The EPC 30 includes the MME, the S-GW, and a Packet Data Network-Gateway (P-GW). The MME has access information about UE or information about the capabilities of UE.

Such information is chiefly used in the mobility management of UE. The S-GW is a gateway having an E-UTRAN as an end point, and the P-GW is a gateway having a PDN as an end point.

The layers of a radio interface protocol between UE and a network may be classified into L1 (first layer), L2 (second layer), and L3 (third layer) based on lower 3 layers of an Open System Interconnection (OSI) reference model which is widely known in communication systems. From among the layers, the PHY layer belonging to the first layer provides information transfer service using physical channels, and a Radio Resource Control (RRC) layer placed in the third layer functions to control radio resources between UE and a network. To this end, the RRC layer exchanges RRC messages between UE and a BS.

Figure 2:
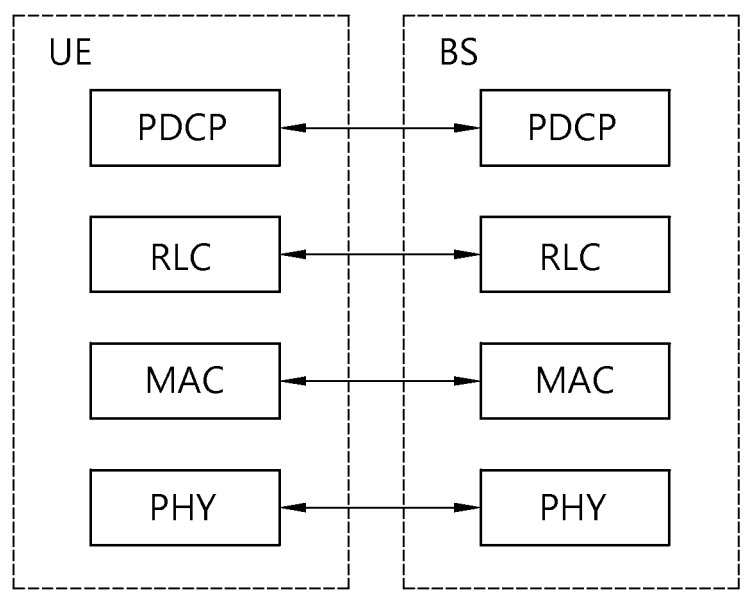
FIG. 2 is a block diagram showing a radio protocol architecture for a user plane.
Figure 3:
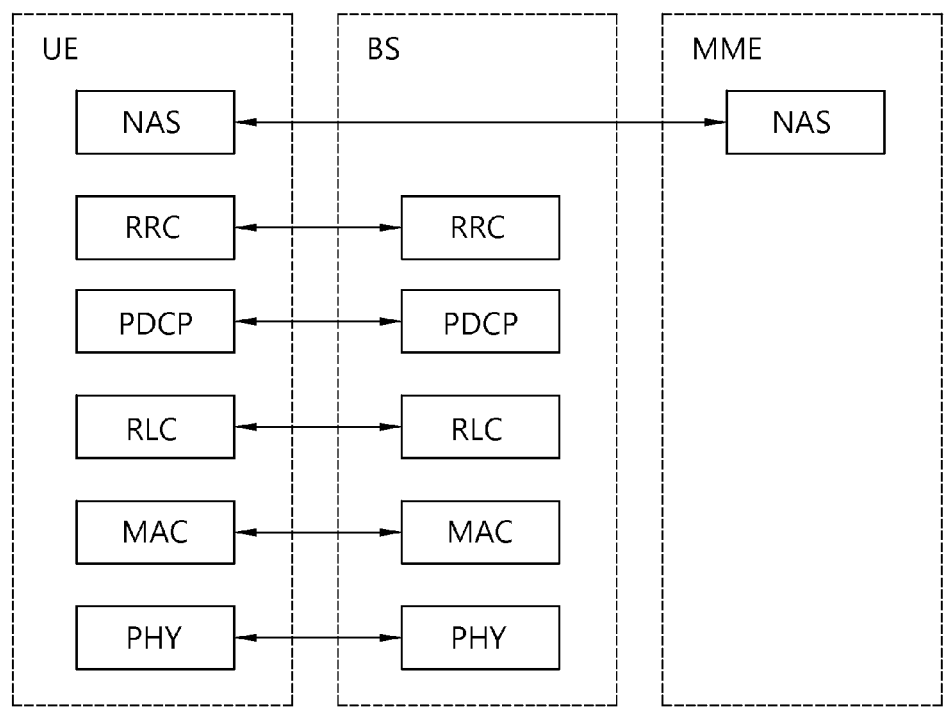
FIG. 3 is a block diagram showing a radio protocol architecture for a control plane.

FIG. 2 is a block diagram showing a radio protocol architecture for a user plane. FIG. 3 is a block diagram showing a radio protocol architecture for a control plane. A data plane is a protocol stack for user data transmission, and a control plane is a protocol stack for control signal transmission.

Referring to FIGS. 2 and 3, a physical (PHY) layer provides a higher layer with information transfer service using physical channels. The PHY layer is connected to a Medium Access Control (MAC) layer, that is, a higher layer, through a transport channel. Data is moved between the MAC layer and the PHY layer through the transport channel. The transport channel is classified depending on how data is transmitted through a radio interface according to what characteristics.

Data is transferred between different PHY layers, that is, between the PHY layers of a transmitter and a receiver, through a physical channel. The physical channel may be modulated according to an Orthogonal Frequency Division Multiplexing (OFDM) scheme, and the physical channel uses the time and frequency as radio resources.

The functions of the MAC layer include mapping between a logical channel and a transport channel and multiplexing/de-multiplexing to a transport block that is provided to a physical channel on the transport channel of an MAC Service Data Unit (SDU) that belongs to a logical channel. The MAC layer provides service to a Radio Link Control (RLC) layer through a logical channel.

The functions of the RLC layer include the concatenation, segmentation, and reassembly of an RLC SDU. In order to guarantee various types of Quality of Service (QoS) required by a Radio Bearer (RB), the RLC layer provides three operation modes: a Transparent Mode (TM), an Unacknowledged Mode (UM), and an Acknowledged Mode (AM). AM RLC provides error correction through an Automatic Repeat Request (ARQ).

The functions of a Packet Data Convergence Protocol (PDCP) layer in the user plane include the transfer, header compression, and ciphering of user data. The functions of the PDCP layer in the user plane include the transfer and ciphering/integrity protection of control plane data.

The Radio Resource Control (RRC) layer is defined only in the control plane. The RRC layer is related to the configuration, re-configuration, and release of RBs and responsible for control of logical channels, transport channels, and physical channels. An RB means a logical path that is provided by the first layer (PHY layer) and the second layers (the MAC layer, the RLC layer, and the PDCP layer) for the transfer of data between UE and a network.

What an RB is configured means a process of regulating the characteristics of a radio protocol layer and channel and configuring each detailed parameter and operation method in order to provide specific service. An RB may be divided into a Signaling RB (SRB) and a Data RB (DRB). The SRB is used as a passage along which an RRC message is transported in the control plane, and the DRB is used as a passage along which user data is transported in the user plane.

If an RRC connection is established between the RRC layer of UE and the RRC layer of an E-UTRAN, the UE is in an RRC connected state. If not, the UE is in the RRC_idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through a downlink SCH or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or a control message is transmitted.

Logical channels placed over a transport channel and mapped to the transport channel include a broadcast control channel (BCCH), a paging control channel (PCCH), a common control channel (CCCH), a multicast control channel (MCCH), a multicast traffic channel (MTCH), and so on.

A physical channel includes several OFDM symbols in a time domain and several subcarriers in a frequency domain. One subframe consists of a plurality of OFDM symbols in the time domain. A resource block is a resource allocation unit, and a resource block consists of a plurality of OFDM symbols and a plurality of subcarriers. Furthermore, each subframe may use specific subcarriers of specific OFDM symbols (e.g., the first OFDM symbol) of a corresponding subframe for a physical downlink control channel (PDCCH), that is, an L1/L2 control channel. A Transmission Time Interval (TTI) is a unit time for subframe transmission.

An RRC state and RRC connection method of UE are described below.

An RRC state means whether or not the RRC layer of UE has been logically connected with the RRC layer of an E-UTRAN. If the RRC layer of UE is logically connection with the RRC layer of an E-UTRAN, it is called the RRC_connected state. If the RRC layer of UE is not logically connection with the RRC layer of an E-UTRAN, it is called the RRC_idle state. Since UE in the RRC_connected state has an RRC connection, an E-UTRAN may check the presence of the UE in a cell unit, and thus the UE may be effectively controlled. In contrast, an E-UTRAN cannot check UE in the RRC_idle state, and UE in the RRC_idle state is managed by a Core Network (CN) in a tracking area, that is, an area unit greater than a cell. That is, the presence of UE in the RRC_idle state is checked in a larger area unit, and the UE in the RRC_idle state needs to move to the RRC connected state in order to receive common mobile communication service, such as voice or data.

When a user first powers on UE, the UE first searches for a suitable cell and remains in the RRC_idle state in a corresponding cell. UE in the RRC_idle state establishes an RRC connection with an E-UTRAN through an RRC connection procedure when it needs to establish the RRC connection and shifts to the RRC_connected state. A case where the UE in the RRC_idle state needs to establish the RRC connection includes several cases. For example, the UE in the RRC_idle state establishes an RRC connection when it needs to send uplink data for a reason, such as a call attempt by a user, or when it sends a message in response to a paging message received from an E-UTRAN.

A Non-Access Stratum (NAS) layer placed over the RRC layer performs functions, such as session management and mobility management.

In order to manage the mobility of UE in the NAS layer, two states: EPS Mobility Management-REGISTERED (EMM-REGISTERED) and EMM-DEREGISTERED are defined. The two states are applied to UE and an MME. Initial UE is in the EMM-DEREGISTERED state. In order for the UE to access a network, the UE performs a process of being registered with the network through an initial attach procedure. If the attach procedure is successfully performed, the UE and the MME become the EMM-REGISTERED state.

In order to manage signaling connection between UE and an EPC, two states: an EPS Connection Management (ECM)-IDLE state and an ECM-CONNECTED state are defined. The two states are applied to UE and an MME. If UE in the ECM-IDLE state establishes an RRC connection with an E-UTRAN, the UE becomes the ECM-CONNECTED state. If an MME in the ECM-IDLE state establishes an S1 connection with the E-UTRAN, the MME becomes the ECM-CONNECTED state. When UE is in the ECM-IDLE state, an E-UTRAN does not have context information about the UE. Accordingly, the UE in the ECM-IDLE state performs a mobility-based procedure based UE, such as cell selection or cell reselection, without a need to receive a command from a network. In contrast, when UE is in the ECM-CONNECTED state, the mobility of the UE is managed by a command from a network. If the location of UE is different from a location known to a network in the ECM-IDLE state, the UE informs the network of the location of the UE through a tracking area update procedure.

System information is described below.

System information includes essential information that needs to be known by UE in order to access a BS. Accordingly, the UE needs to have received all pieces of system information before accessing the BS and needs to always have recent system information. Furthermore, system information is information that needs to be known by all pieces of UE within one cell, and thus a BS periodically transmits the system information.

In accordance with Paragraph 5.2.2 of 3GPP TS 36.331 V8.7.0 (2009-09) "Radio Resource Control (RRC); Protocol specification (Release 8)", system information is classified into a Master Information Block (MIB), a Scheduling Block (SB), and a System Information Block (SIB). The MIB enables UE to know the physical configuration of a corresponding cell, for example, a bandwidth. The SB informs information about the transmission of SIBs, for example, a transport period. The SIB is a collection of pieces of correlated system information. For example, any SIB includes only information about neighboring cells, and any SIB includes only information about an uplink radio channel used by UE.

In general, service provided from a network to UE may be classified into three types as follows. Furthermore, UE differently recognizes the type of cell depending on what service may be received. A service type is first described, and the type of cell is then described.

1) Limited service: this service provides an emergency call and an Earthquake and Tsunami Warning System (ETWS), and this service can be provided by an acceptable cell.

2) Normal service: this service means public use for common purposes, and this service can be provided by a suitable or normal cell.

3) Operator service: this service means service for a communication network service provider, and this cell can be used only by a communication network service provider, but cannot be used by a common user.

In relation to a service type provided by a cell, the type of cell can be classified as follows.

1) Acceptable cell: a cell from which UE can be provided with limited service. This cell is a cell which is not barred from a viewpoint of corresponding UE, but satisfies a cell selection criterion for the UE.

2) Suitable cell: a cell from which UE can be provided with suitable service. This cell satisfies a condition for an acceptable cell and also satisfies an additional condition. The additional condition includes that this cell needs to belong to a Public Land Mobile Network (PLMN) accessible to corresponding UE and this cell must be a cell on which a tracking area update procedure is not barred from being executed by UE. If a corresponding cell is a CSG cell, the CSG cell needs to be a cell that UE can access as a CSG member.

3) Barred cell: a cell that broadcasts that this cell is a cell barred through system information.

4) Reserved cell: a cell that broadcasts that this cell is a cell reserved through system information.

Figure 4:
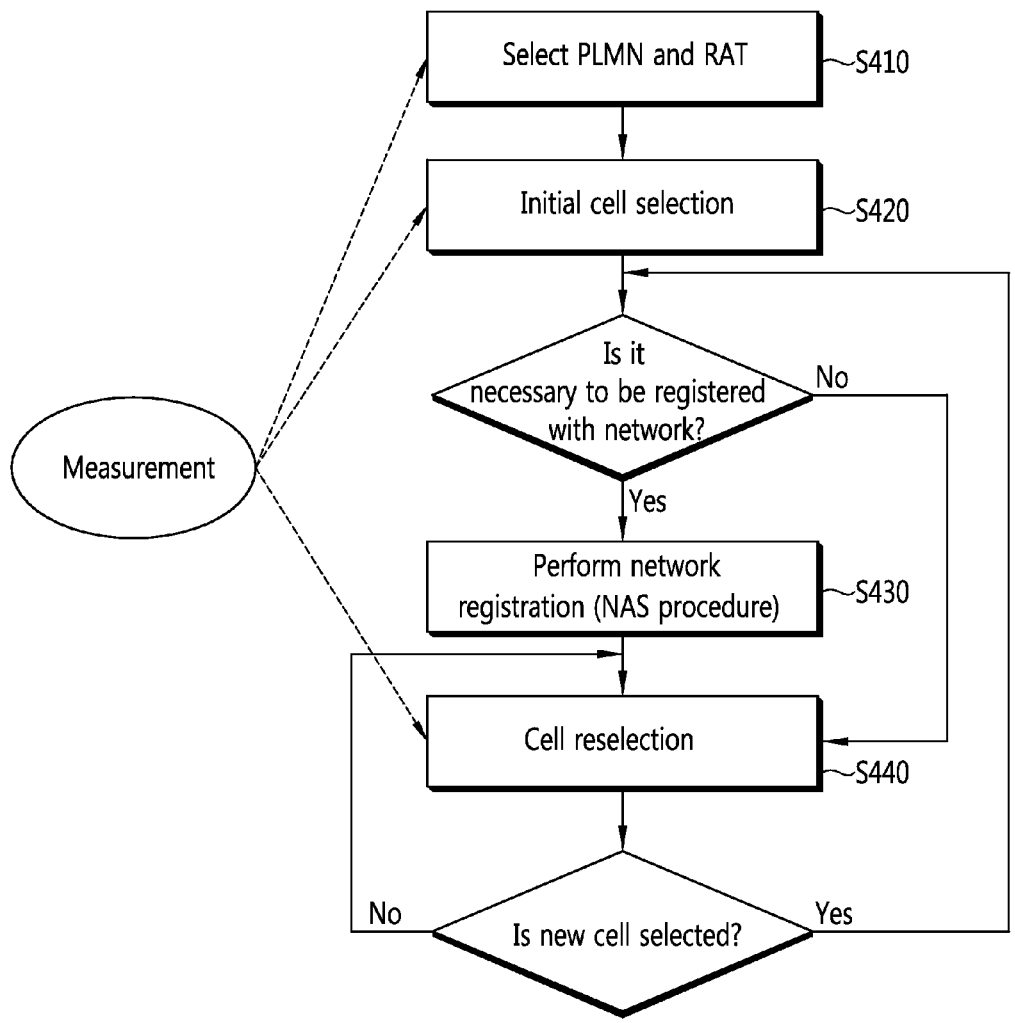
FIG. 4 is a flowchart illustrating the operation of UE in the RRC_idle state.

FIG. 4 is a flowchart illustrating the operation of UE in the RRC_idle state. FIG. 4 shows a procedure in which UE that is initially powered on is registered with a network through a cell selection process and the UE performs cell reselection, if necessary.

Referring to FIG. 4, the UE selects Radio Access Technology (RAT) for communicating with a Public Land Mobile Network (PLMN), that is, a network from which the UE is provided with service (S410). Information about the PLMN and the RAT may be selected by the user of the UE, and information stored in a Universal Subscriber Identity Module (USIM) may be used.

The UE selects a cell having the greatest value from cells whose measured BS and signal intensity or quality is greater than a specific value (S420). In this case, powered-on UE performs cell selection, which may be called initial cell selection. Cell selection procedure is described in detail later. After the cell selection, the UE receives system information that is periodically transmitted by a BS. The specific value refers to a value defined in a system in order to guarantee quality for a physical signal in data transmission/reception. Accordingly, the value may be different depending on applied RAT.

If the UE needs to be registered with a network, the UE performs a network registration procedure (S430). The UE registers its own information (e.g., IMSI) with the network in order to receive service (e.g., paging) from the network. The UE does not register its information with an accessing network whenever the UE selects a cell, but registers its information with a network if information (e.g., Tracking Area Identity (TAI)) about the network received from system information is different from information about the network which has been known to the UE.

The UE performs cell reselection based on a service environment provided by a cell, the environment of the UE, etc. (S440). If a value of the intensity or quality of a signal measured from a BS that provides service to the UE is lower than a value measured from a BS of a neighboring cell, the UE selects a cell from other cells that provide better signal characteristics than the cell of the BS that the UE has accessed. This process is called cell reselection differently from the initial cell selection of second process. Here, in order to prevent a cell from being frequently reselected depending on a change of signal characteristics, a temporal restriction condition is imposed. The cell reselection procedure is described in detail later.

Figure 5:
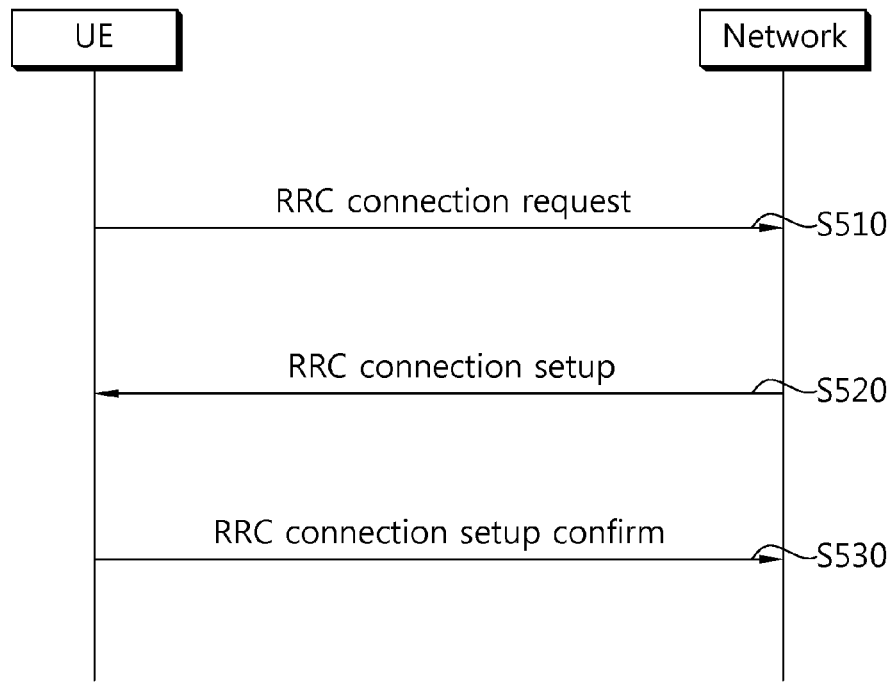
FIG. 5 is a flowchart illustrating a process of setting up an RRC connection.

FIG. 5 is a flowchart illustrating a process of setting up an RRC connection.

UE transmits an RRC connection request message, requesting an RRC connection, to a network (S510). The network transmits an RRC connection setup message in response to the RRC connection request (S520). After receiving the RRC connection setup message, the UE enters an RRC connected mode.

The UE transmits an RRC connection setup complete message, used to check the successful completion of the RRC connection setup, to the network (S530).

Figure 6:
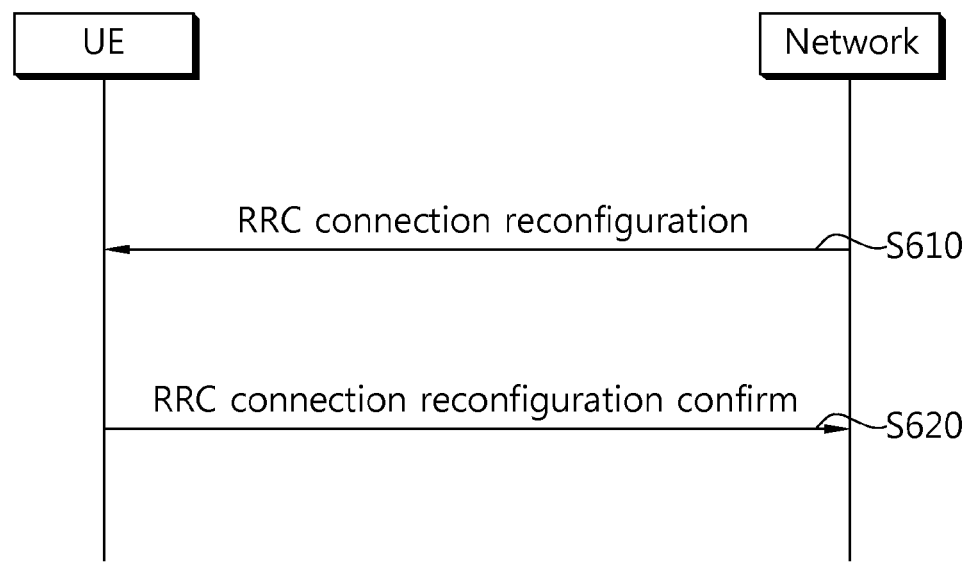
FIG. 6 is a flowchart illustrating a process of reconfiguring an RRC connection.

FIG. 6 is a flowchart illustrating a process of reconfiguring an RRC connection. An RRC connection reconfiguration is used to modify an RRC connection. This is used to set up, modify/release an RB, perform handover, and set up, modify/release measurement.

A network transmits an RRC connection reconfiguration message for modifying an RRC connection to UE (S610). The UE transmits an RRC connection reconfiguration complete message used to check the successful completion of an RRC connection reconfiguration to the network in response to the RRC connection reconfiguration (S620).

A radio link failure is described below.

UE continues to perform measurement in order to maintain the quality of a radio link to a serving cell from which service is received. The UE determines whether or not communication is impossible in a current situation due to the deterioration of quality of a radio link to a serving cell. If communication is almost impossible because the quality of a serving cell is too low, the UE determines a current situation to be a radio connection failure.

If a radio link failure is determined, the UE forgives maintaining communication with a current serving cell, selects a new cell through a cell selection (or cell reselection) procedure, and attempts an RRC connection reestablishment to the new cell.

Figure 7:
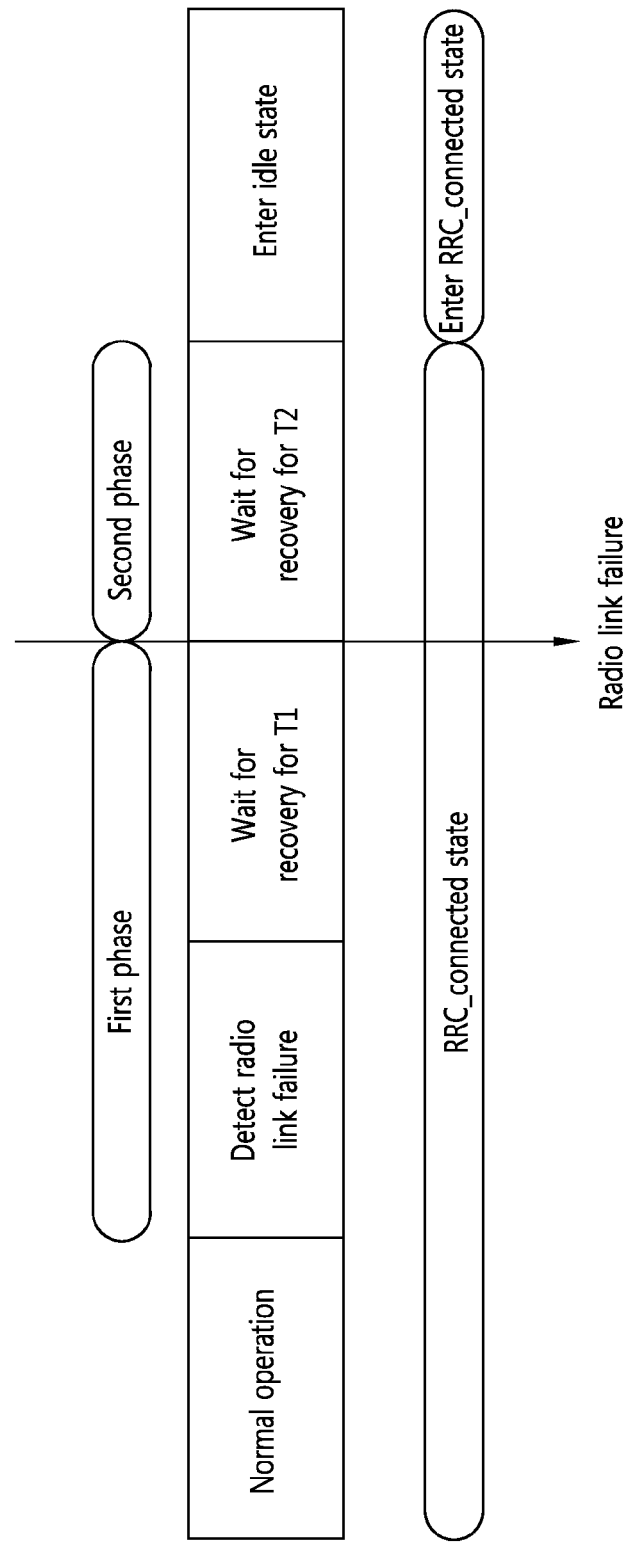
FIG. 7 is an exemplary diagram showing a radio link failure.

FIG. 7 is an exemplary diagram showing a radio link failure. An operation related to a radio link failure may be described in two phases.

In the first phase, UE performs a normal operation and checks whether or not there is a problem in a current communication link. If a problem is detected, the UE declares a radio link problem and waits for the recovery of a radio link for a first standby time T1. If the radio link is recovered before the first standby time elapses, the UE performs a normal operation again. If the radio link is not recovered until the first standby time expires, the UE declares a radio link failure and enters the second phase.

In the second phase, the UE waits for the recovery of the radio link for a second standby time T2. If the radio link is not recovered until the second standby time expires, the UE enters the RRC_idle state. Or, the UE may perform an RRC reestablishment procedure.

The RRC connection reestablishment procedure is a procedure of reestablishing an RRC connection again in the RRC_connected state. Since the UE remains in the RRC_connected state, that is, since the UE does not enter the RRC_idle state, the UE does not initialize all its radio configurations (e.g., radio bearer configurations). Instead, the UE suspends the use of all radio bearers other than an SRB0 when starting an RRC connection reconfiguration procedure. If an RRC connection reconfiguration is successful, the UE resumes the use of suspended radio bearers.

Figure 8:
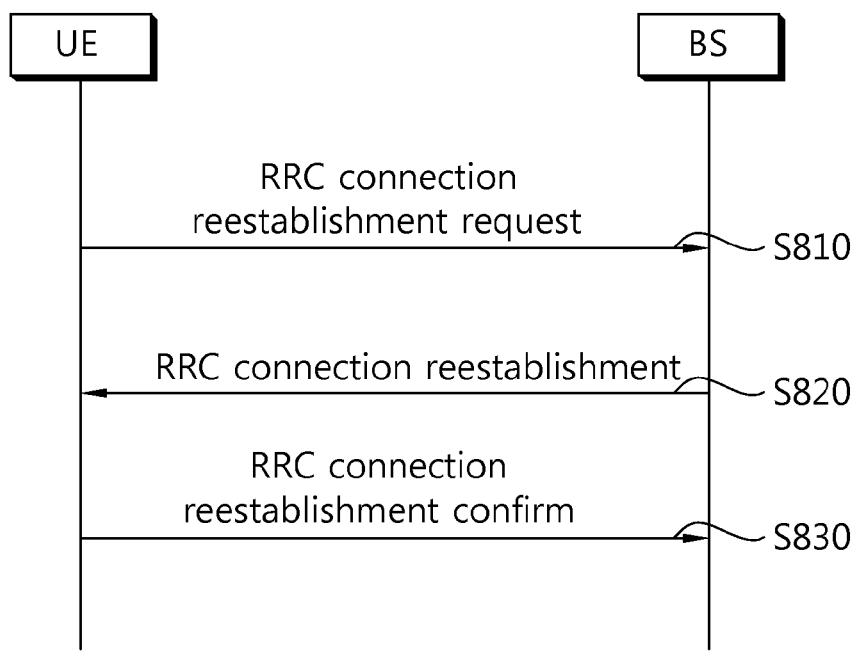
FIG. 8 is a flowchart illustrating the success of a connection reestablishment process.

FIG. 8 is a flowchart illustrating the success of a connection reestablishment process.

UE selects a cell by performing cell selection. The UE receives system information in order to receive basic parameters for cell access in the selected cell. Furthermore, the UE sends an RRC connection reestablishment request message to a BS (S810).

If the selected cell is a cell having the context of the UE, that is, a prepared cell, the BS accepts the RRC connection reestablishment request of the UE and transmits an RRC connection reestablishment message to the UE (S820). The UE transmits an RRC connection reestablishment complete message to the BS, so the RRC connection reestablishment procedure can be successful (S830).

Figure 9:
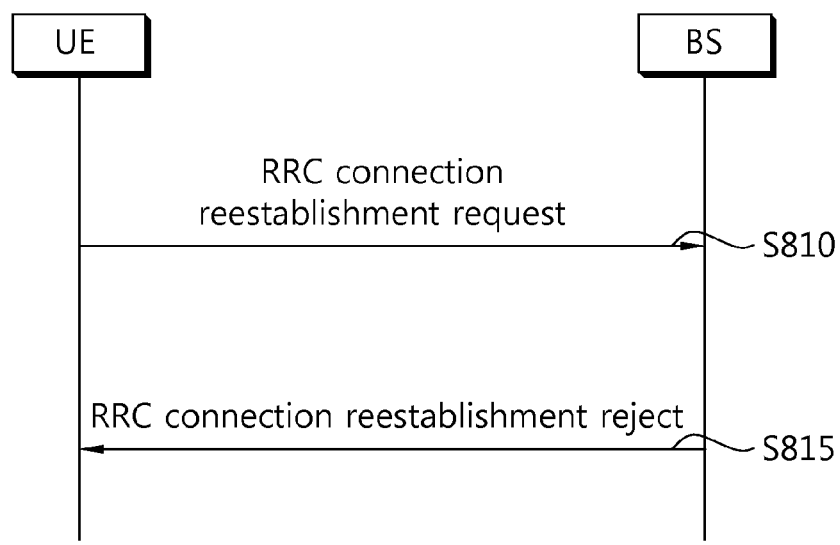
FIG. 9 is a flowchart illustrating the failure of a connection reestablishment process.

FIG. 9 is a flowchart illustrating the failure of a connection reestablishment process. UE transmits an RRC connection reestablishment request message to a BS (S810). If a selected cell is not a prepared cell, the BS transmits an RRC connection reestablishment reject message to the UE in response to the RRC connection reestablishment request (S815).

A radio link failure described with reference to FIG. 7 can be generated due to the occurrence of a physical layer problem in an RRC_connected state, the occurrence of a random access problem, or an instruction related to retransmission on the RLC side.

When detecting a radio link failure or a handover failure, UE generates radio link failure report information. The radio link failure information can include information about the identity of a PLMN corresponding to the cell having the radio link failure, a recent measurement result (it may include RSRP and RSRQ) on a serving cell, a measurement result on a neighboring cell, information about the location of the UE, and the global cell identity of the cell having the radio link failure. If UE generates radio link failure information attributable to a radio link failure, the UE can include information indicating that the radio link failure information has been generated due to the radio link failure. If UE generates radio link failure information attributable to a handover failure, the UE can include information indicating that the radio link failure information has been generated due to the handover failure.

When a radio link fails, UE can report the radio link failure to a network. The report of the radio link failure by the UE can be initiated when the UE transmits a message that completes the establishment of an RRC connection with the network. In order to inform that a radio link failure to be reported is present, UE can include a radio link failure-available indicator in an RRC connection complete message (an RRC connection configuration confirm, RRC connection reconfiguration confirm, or RRC connection reestablishment confirm message) and transmit the RRC connection complete message.

The BS of a cell checks the radio link failure-available indicator. If it is checked that radio link failure information to be reported by UE is present, the BS sends a message that requests the UE to obtain UE information to the UE. In response thereto, the UE sends a UE information response message, including the radio link failure information, to the BS.

A procedure of UE selecting a cell is described in detail below.

When UE is powered on or the UE remains in a cell, the UE performs procedures for receiving service by selecting/reselecting a cell having suitable quality.

UE in the RRC_idle state always needs to select a cell having suitable quality and to be prepared to receive service through this cell. For example, UE that is just powered on needs to select a cell having suitable quality in order to be registered with a network. When the UE in the RRC_connected state enters the RRC_idle state, the UE needs to select a cell in which the UE will remain in the RRC_idle state. A process in which the UE selects a cell that satisfies any condition in order to remain in a service standby state, such as the RRC_idle state, as described above is called cell selection. An important point is that the UE needs to select a cell as rapidly as possible because cell selection is performed in the state in which the UE has not determined a cell in which the UE will remain in the RRC_idle state. Accordingly, if a cell provides the quality of a radio signal higher than a certain reference, although the cell is not a cell that provides the best quality of a radio signal to the UE, the cell may be selected in the cell selection process of the UE.

A method and procedure of UE selecting a cell in 3GPP LTE are described below with reference to 3GPP TS 36.304 V8.5.0 (2009-03) "User Equipment (UE) procedures in idle mode (Release 8)".

When UE is initially powered on, the UE searches for an available Public Land Mobile Network (PLMN) and selects a suitable PLMN from which service may be received. The PLMN is a network that is deployed or managed by a mobile network operator. Each mobile network operator manages one or more PLMNs. Each PLMN can be identified by Mobile Country Code (MCC) and Mobile Network Code (MNC). Information about the PLMN of a cell is included in system information and broadcasted. UE attempts to register a selected PLMN. If the registration is successful, the selected PLMN becomes a Registered PLMN (RPLMN). A network may signal a PLMN list to the UE. PLMNs included in the PLMN list may be considered to be the same PLMNs as RPLMNs. UE registered with a network needs to be always reachable by the network. If UE is in the ECM-CONNECTED state (identically an RRC_connected state), a network recognizes that the UE is provided with service. If the UE is in the ECM-IDLE state (identically the RRC_idle state), the situation of the UE is not valid in an eNB, but is stored in an MME. In this case, only the MME is informed of the location of the UE in the ECM-IDLE state as the granularity of a list of Tracking Areas (TAs). A single TA is identified by a Tracking Area Identity (TAI) including a PLMN identity to which the TA belongs and Tracking Area Code (TAC) that uniquely represent a TA within a PLMN.

Next, the UE selects a cell having signal quality and characteristics from which the UE can be provided with suitable service from cells provided by the selected PLMN.

A cell selection process is chiefly divided into two types.

First, as an initial cell selection process, in this process, UE does not have preliminary information about a radio channel. Accordingly, in order to find a suitable cell, the UE searches all radio channels. The UE searches each channel for the strongest cell. Next, the UE selects a corresponding cell only if it has only to find a suitable cell that satisfies a cell selection reference.

Next, the UE may select a cell using stored information or using information broadcasted by a cell. Accordingly, cell selection may be faster than an initial cell selection process. The UE selects a corresponding cell if it has only to find a cell that satisfies a cell selection reference. If a suitable cell that satisfies the cell selection reference is not found through this process, the UE performs an initial cell selection process.

After UE selects any cell through a cell selection process, the intensity or quality of a signal between the UE and a BS may be changed due to the mobility of the UE or a change of a radio environment. Accordingly, if the quality of a selected cell is deteriorated, the UE may select another cell that provides better quality. If a cell is selected again as described above, the UE selects a cell that provides better signal quality than a currently selected cell. This process is called cell reselection. In general, the cell reselection process has a basic object to select a cell that provides the best quality to UE from a viewpoint of the quality of a radio signal.

In addition to the viewpoint of the quality of a radio signal, a network can determine priority by the frequency and inform UE of the determined priority. The UE which has received the priority preferentially considers this priority to be higher than a radio signal quality reference in a cell reselection process.

There is a method of selecting or reselecting a cell based on the signal characteristics of a radio environment as described above. Upon cell reselection, in selecting a cell for reselection, the following cell reselection method may be used depending on the RAT and frequency characteristics of a cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principle of a cell reselection process is as follows.

First, UE measures the quality of a serving cell and a neighboring cell for cell reselection.

Second, cell reselection is performed based on a cell reselection reference. The cell reselection reference has the following characteristics in relation to the measurement of the serving cell and the neighboring cell.

Intra-frequency cell reselection is basically based on ranking. Ranking is a task for defining a criterion value for cell reselection evaluation and ranking cells using the criterion value in order of a higher criterion value. A cell having the best criterion is commonly called the best ranked cell. The cell criterion value is a value to which a frequency offset or a cell offset has been applied, if necessary, on the basis of a value measured by UE for a corresponding cell.

Inter-frequency cell reselection is based on frequency priority provided by a network. UE attempts to camp on a frequency having the highest frequency priority. A network may provide frequency priority that will be in common applied by pieces of UEs within a cell through broadcast signaling or may provide frequency-dedicated priority according to each piece of UE through UE-dedicated signaling.

For inter-frequency cell reselection, a network may provide UE with a parameter (e.g., a frequency-specific offset) used in cell reselection by the frequency.

For intra-frequency cell reselection or inter-frequency cell reselection, a network may provide UE with a Neighboring Cell List (NCL) used in cell reselection. The NCL includes a cell-specific parameter (e.g., a cell-specific offset) used in cell reselection.

For intra-frequency or inter-frequency cell reselection, a network may provide UE with a cell reselection black list used in cell reselection. UE does not perform cell reselection on a cell that is included in the black list Ranking performed in a cell reselection evaluation process is described below.

A ranking criterion used to assign priority to a cell is defined as in Equation 1.

$$R_s = Q_{meas,s} + Q_{hyst}, \quad R_n = Q_{meas,n} + Q_{offset} \qquad \text{[Equation 1]}$$

Here, $R_s$ is a ranking criterion for a serving cell, $R_n$ is a ranking criterion for a neighboring cell, $Q_{meas,s}$ is a quality value measured by UE in relation to a serving cell, $Q_{meas,n}$ is a quality value measured by UE in relation to a neighboring cell, $Q_{hyst}$ is a hysteresis value for ranking, and $Q_{offset}$ is an offset between two cells.

In Intra-frequency, if UE receives an offset $Q_{offsets,n}$ between a serving cell and a neighboring cell, $Q_{offset} = Q_{offsets,n}$. If UE does not receive $Q_{offsets,n}$, $Q_{offset} = 0$.

In Inter-frequency, if UE receives an offset $Q_{offsets,n}$ for a corresponding cell, $Q_{offset} = Q_{offsets,n} + Q_{frequency}$. If UE does not receive $Q_{offsets,n}$, $Q_{offset} = Q_{frequency}$.

If the ranking criterion $R_s$ of a serving cell and the ranking criterion $R_n$ of a neighboring cell are shifted in a similar state, UE may alternately reselect two cells because ranking priority is frequently changed as a result of the shift. $Q_{hyst}$ is a parameter that prevents UE from alternately reselecting two cells by giving a hysteresis in cell reselection.

UE measures $R_s$ of a serving cell and $R_n$ of a neighboring cell according to the above equation, considers a cell having the greatest ranking criterion value to be the best ranked cell, and reselects the cell.

In accordance with the reference, it may be seen that the quality of a cell functions as the most important reference in cell reselection. If a reselected cell is not a suitable cell, UE excludes a corresponding frequency or a corresponding cell from the subject of cell reselection.

Measurement and a measurement report are described below.

In a mobile communication system, the mobility support of UE is essential. Accordingly, UE consistently measures quality for a serving cell which now provides service and quality for a neighboring cell. UE reports a measurement result to a network on a suitable time, and a network provides the UE with the optimal mobility through handover, etc. Measurement for this purpose is called Radio Resource Management (RRM) Measurement.

In addition to the mobility support object, in order to provide information that may help a service provider to manage a network, UE may perform measurement for a specific object set by the network and report a measurement result thereof to the network. For example, UE may receive broadcast information about a specific cell that has been determined by a network. UE may report a cell identity of the specific cell (this is also called a global cell identity), location identity information (e.g., tracking area code) to which the specific cell belongs and/or other cell information (e.g., whether or not the specific cell is a member of a Closed Subscriber Group (CSG) cell) to a serving cell.

If UE in motion checks that the quality of a specific area is very poor through measurement, the UE may report location information and a measurement result of cells having poor quality to a network. The network may attempt to optimize the network based on a report on measurement results from pieces of UE that help the operation of the network.

In a mobile communication system whose frequency reuse factor is 1, mobility is chiefly performed between different cells in the same frequency band. Accordingly, in order to well guarantee the mobility of UE, the UE needs to be able to well measure the quality of neighboring cells having the same center frequency as a serving cell and information about the cells. As described above, measurement for a cell having the same center frequency as a serving cell is called intra-frequency measurement. UE performs intra-frequency measurement and reports a measurement result to a network on a suitable time so that the object of a corresponding measurement result is achieved.

A mobile communication service provider may manage a network using a plurality of frequency bands. If a communication system provides service through a plurality of frequency bands, in order to guarantee optimal mobility for UE, the UE needs to be able to well measure the quality of neighboring cells having a different center frequency from a serving cell and information about the cells. As described above, measurement for a cell having a different center frequency from a serving cell is called inter-frequency measurement. UE needs to be able to perform inter-frequency measurement and report a measurement result to a network on a suitable time.

If UE supports measurement for a heterogeneous network, measurement may be performed on a cell of a heterogeneous network based on a BS configuration. Such measurement for a heterogeneous network is called inter-Radio Access Technology (RAT) measurement. For example, RAT may include a UMTS Terrestrial Radio Access Network (UTRAN) and a GSM EDGE Radio Access Network (GERAN) that comply with the 3GPP standard and may also include a CDMA 2000 system that complies with the 3GPP2 standard.

Figure 10:
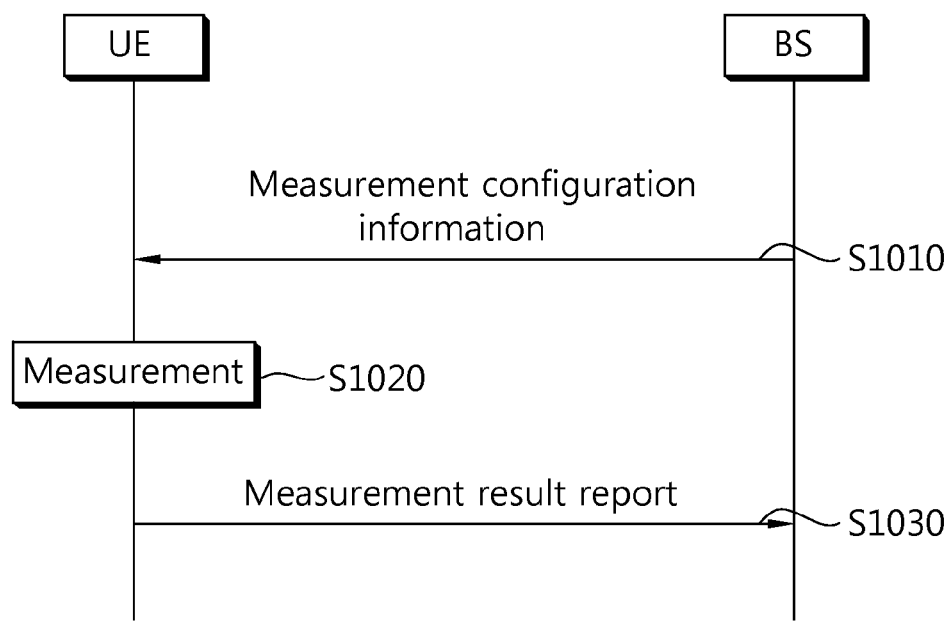
FIG. 10 is a flowchart illustrating an existing method of performing measurement.

FIG. 10 is a flowchart illustrating an existing method of performing measurement.

UE receives measurement configuration information from a BS (S1010). A message including the measurement configuration information is called a measurement configuration message. The UE performs measurement based on the measurement configuration information (S1020). The UE reports a measurement result to the BS if the measurement result satisfies a report condition within the measurement configuration information (S1030). A message including the measurement result is called a measurement report message.

The measurement configuration information may include the following information.

(1) Measurement object information: information about the object on which measurement will be performed by UE. The measurement object includes at least one of an intra-frequency measurement object that is the object of intra-cell measurement, an inter-frequency measurement object that is the object of inter-cell measurement, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a different frequency band from a serving cell, and the inter-RAT measurement object may indicate a neighboring cell having different RAT from a serving cell.

(2) Reporting configuration information: information about a report condition regarding when UE reports a measurement result and about a report type. The report condition may include information about an event or period in which a report on a measurement result is triggered. The report type is information regarding that a measurement result will be configured according to what type.

(3) Measurement identity information: information about a measurement identity, which makes UE determine to report what measurement object according to what type when in association with a measurement object and a reporting configuration. The measurement identity information is included in a measurement report message, and it may indicate that a measurement result is about what measurement object and that a measurement report has been generated under what report condition.

(4) Quantity configuration information: information about a parameter for configuring the filtering a measurement unit, a report unit and/or a measurement result value.

(5) Measurement gap information: information about a measurement gap, that is, an interval which may be used by UE for only measurement without taking data transmission to a serving cell into consideration, because DL transmission or UL transmission has not been scheduled.

In order to perform a measurement procedure, UE has a measurement object list, a measurement report configuration list, and a measurement identity list.

In 3GPP LTE, a BS may configure only one measurement object for one frequency band regarding UE. In accordance with Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)", events triggered by a measurement report, such as those in the following table, are defined.

TABLE 1

| Events | Report Conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than serving |
| Event A5 | Serving becomes worse than threshold1 and neigbour becomes better than threshold2 |
| Event B1 | Inter RAT neighbor becomes better than threshold |
| Event B2 | Serving becomes worse than threshold1 and inter RAT neighbor becomes better than threshold2 |

If the measurement report of UE satisfies a set event, the UE transmits a measurement report message to a BS.

Figure 11:
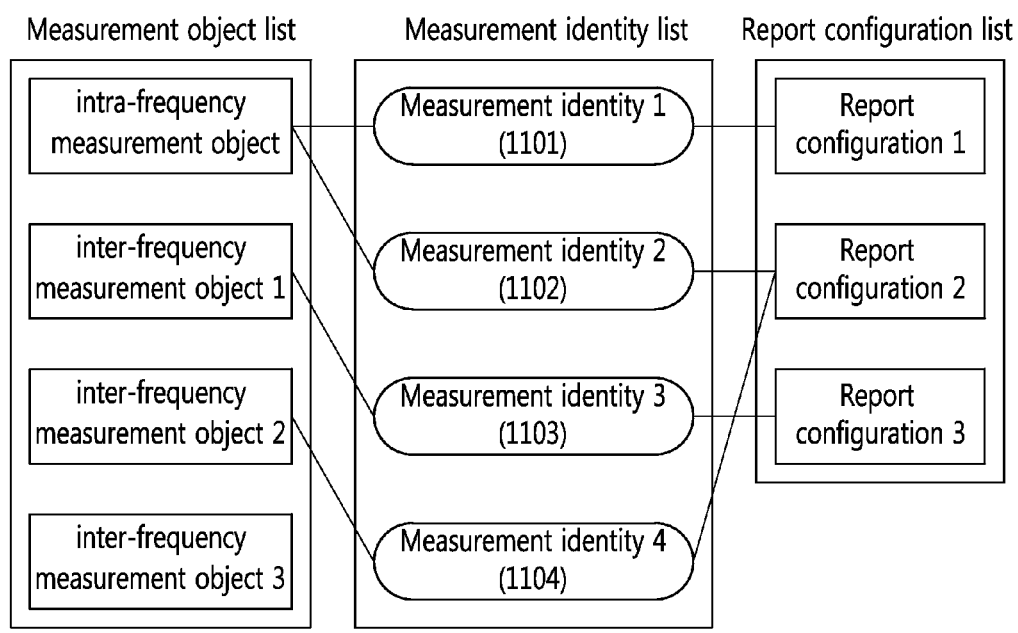
FIG. 11 shows an example in which a measurement identity is deleted.

FIG. 11 shows an example of a measurement configuration configured for UE.

First, a measurement identity 1 (1101) connects an intra-frequency measurement object and a reporting configuration 1. UE performs intra-frequency measurement, and the reporting configuration 1 is used to determine a reference and report type for a measurement result report.

Like the measurement identity 1 (1101), a measurement identity 2 (1102) is connected to the intra-frequency measurement object, but the measurement identity 2 (1102) connects the intra-frequency measurement object and a reporting configuration 2. UE performs intra-frequency measurement, and the reporting configuration 2 is used to determine a reference and a report type for a measurement result report.

Based on the measurement identity 1 (1101) and the measurement identity 2 (1102), UE transmits a measurement result of the intra-frequency measurement object if the measurement result satisfies any one of the reporting configuration 1 and the reporting configuration 2.

A measurement identity 3 (1103) connects an inter-frequency measurement object 1 and a reporting configuration 3. UE reports a measurement result of the inter-frequency measurement object 1 if the measurement result satisfies a report condition included in the reporting configuration 1.

A measurement identity 4 (1104) connects an inter-frequency measurement object 2 and the reporting configuration 2. UE reports a measurement result of the inter-frequency measurement object 2 if the measurement result satisfies a report condition included in the reporting configuration 2.

Meanwhile, a measurement object, a reporting configuration and/or a measurement identity may be added, changed and/or deleted. This may be indicated when a BS transmits a new measurement configuration message to UE or transmits a measurement configuration change message to the UE.

Figure 12:
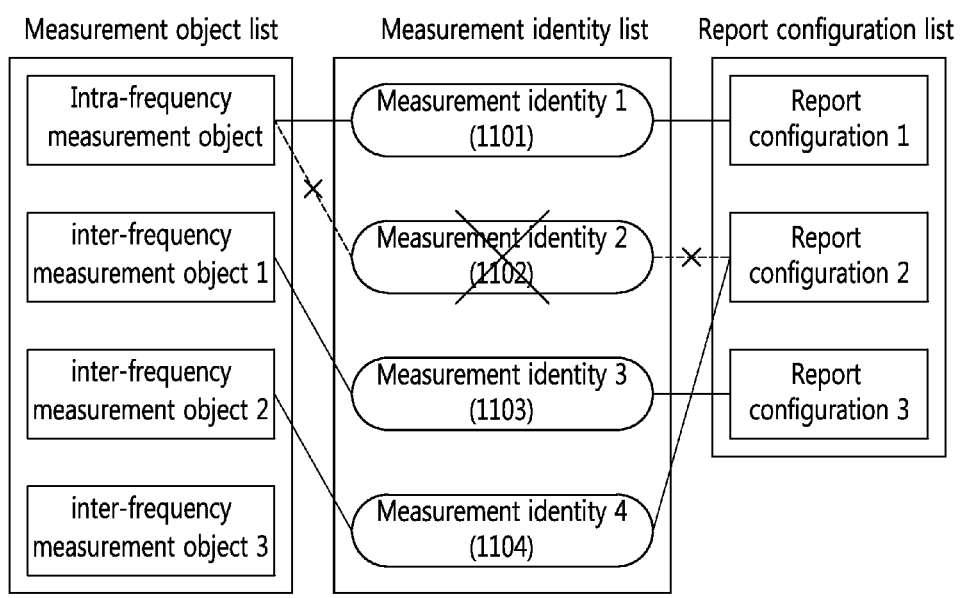
FIG. 12 shows an example in which a measurement object is deleted.

FIG. 12 shows an example in which a measurement identity is deleted. When a measurement identity 2 (1102) is deleted, measurement for a measurement object associated with the measurement identity 2 (1102) is suspended, and a measurement report is not also transmitted. A measurement object or a reporting configuration associated with the deleted measurement identity may not be changed.

Figure 13:
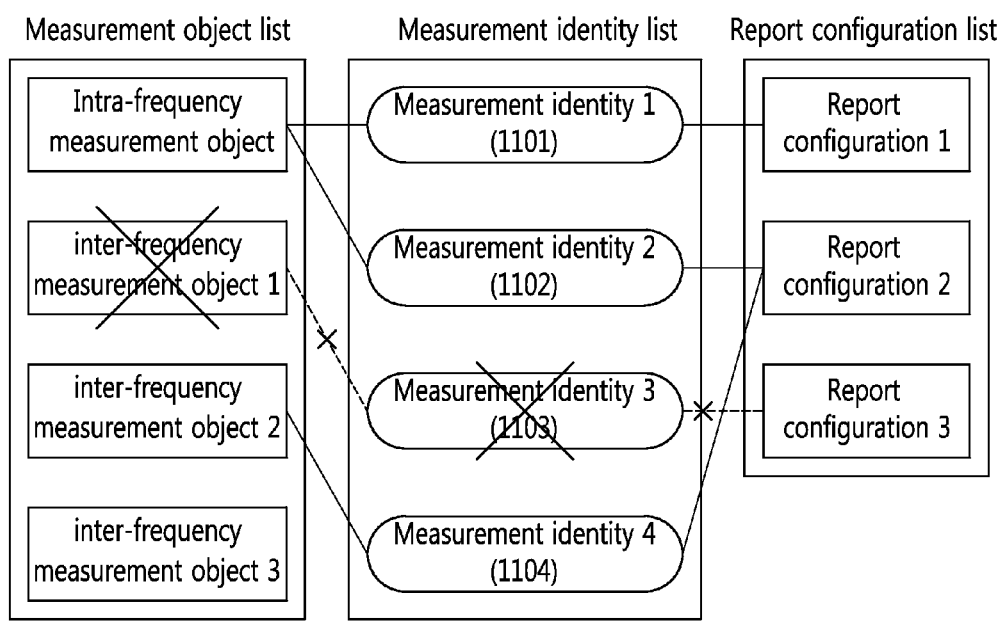
FIG. 13 is a flowchart illustrating an existing measurement procedure.

FIG. 13 shows an example in which a measurement object is deleted. When an inter-frequency measurement object 1 is deleted, UE also deletes an associated measurement identity 3 (1103). Measurement for the inter-frequency measurement object 1 is suspended, and a measurement report is also not transmitted. However, a reporting configuration associated with the deleted intra-frequency measurement object 1 may not be changed or deleted.

When a reporting configuration is removed, UE also removes an associated measurement identity. UE suspends measurement for a measurement object associated by the associated measurement identity. However, a measurement object associated with the deleted reporting configuration may not be changed or deleted.

A measurement report may include a measurement identity, the measured quality of a serving cell, and a measurement result of a neighboring cell. The measurement identity identifies a measurement object whose measurement report has been triggered. The measurement result of the neighboring cell may include a cell identity and measured quality of the neighboring cell. The measured quality may include at least one of Reference Signal Received Power (RSRP) and Reference Signal Received Quality (RSRQ).

A Minimization Drive Test (MDT) is described below.

An MDT enables UE to perform measurement and report a result thereof instead of a drive test in which conventional service providers measure the quality of cells using vehicles for cell coverage optimization. Coverage varies depending on the location of a BS, the deployment of peripheral buildings, and a use environment of a user. Accordingly, a service provider needs to periodically perform a drive test, which consumes lots of costs and resources. In order to overcome the disadvantages, there is proposed an MDT in which a service provider measures coverage using UE.

A service provider may write a coverage map, indicating whether or not service is possible over the entire area to which service is provided by a service provider and a distribution of QoS, by synthesizing MDT measurement values received from several pieces of UE and use the written coverage map in network operations and optimization. For example, when a report on a coverage problem for a specific area is received from UE, a service provider may enlarge the coverage of a corresponding area cell by increasing the transmission power of a BS that provides service to the corresponding area. The time and cost necessary for network optimization can be minimized through such a method.

An MDT has been produced based on the framework of a tracking function, that is, one of the tools of an operator for Operation, Administration, and Maintenance (OAM). The tracking function provides an operator with the ability to perform tracking and to log the behaviors of UE and thus can enable the operator to determine the major cause of a function failure on the UE side. Traced data is collected over a network, which is called a Trace Collection Entity (TCE). An operator uses data collected in a TCE for analysis and evaluation. A tracking function used for an MDT includes signaling based on a tracking function and management based on tracking function. Signaling based on a tracking function is used to activate an MDT task toward specific UE, whereas management based on tracking functions is used to activate an MDT task without being limited to specific UE.

An MDT may be divided into two types: a logged MDT and an immediate MDT depending on whether UE reports measured and stored log data in a non-real time or in real time. The logged MDT is a method of UE performing MDT measurement, logging corresponding data, and sending the logged data to a network. In contrast, the immediate MDT is a method of UE performing MDT measurement and immediately sending corresponding data to a network. In accordance with the logged MDT, UE performs MDT measurement in the RRC_idle state. In accordance with the immediate MDT, UE performs MDT measurement in the RRC_connected state.

Figure 14:
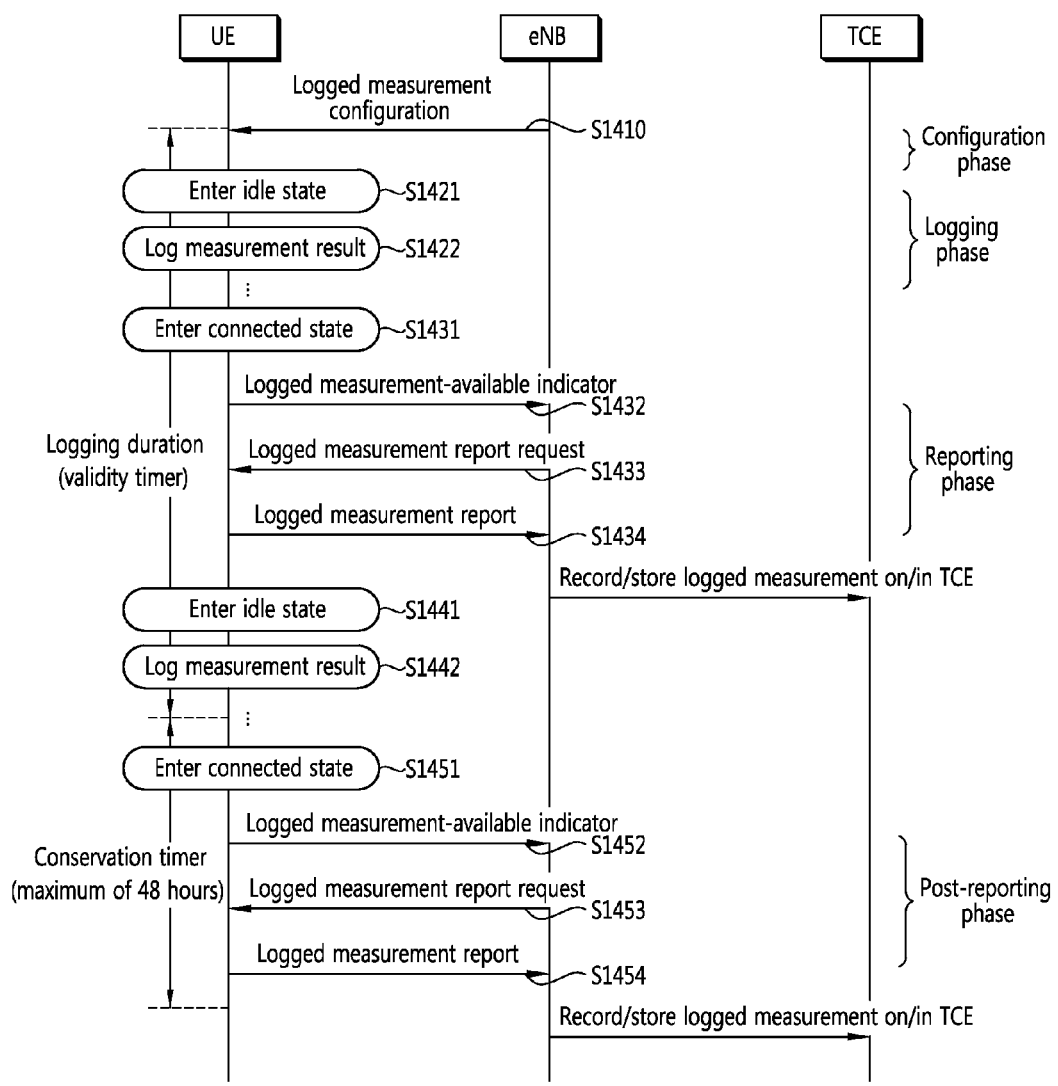
FIG. 14 is a flowchart illustrating a method of performing a logged MDT.

FIG. 14 is a flowchart illustrating a method of performing a logged MDT.

Referring to FIG. 14, UE receives a logged measurement configuration (S1410). The logged measurement configuration may be included in an RRC message and transmitted through a downlink control channel. The logged measurement configuration may include at least one of a TCE ID, information about a reference time that is a basis for logging, logging duration, a logging interval, and information about an area configuration. The logging interval indicates an interval in which a measurement result is stored. The logging duration indicates duration for which UE performs a logged MDT. The reference time indicates a reference time for duration for which a logged MDT is performed. The area configuration indicates an area that has been requested to be logged by UE.

Meanwhile, UE initiates a validity timer when a logged measurement configuration is received. The validity timer means the lifetime of the logged measurement configuration, which may be specified by information about logging duration. The duration of the validity timer may indicate the validity of measurement results owned by UE as well as the valid lifetime of a logged measurement configuration.

A procedure in which UE performs a logged measurement configuration and a corresponding overall procedure is performed as described above is called a configuration phase.

When the UE enters the RRC_idle state (S1421), the UE logs the measurement result while the validity timer is driven (S1422). A measurement result value may include RSRP, RSRQ, Received Signal Code Power (RSCP), Ec/No, etc. Information on which a measurement result has been logged is called logged measurement. A temporal interval in which UE logs a measurement result one or more times is called a logging phase.

The execution of a logged MDT based on a logged measurement configuration by UE may vary depending on the location of the UE.

Figure 15:
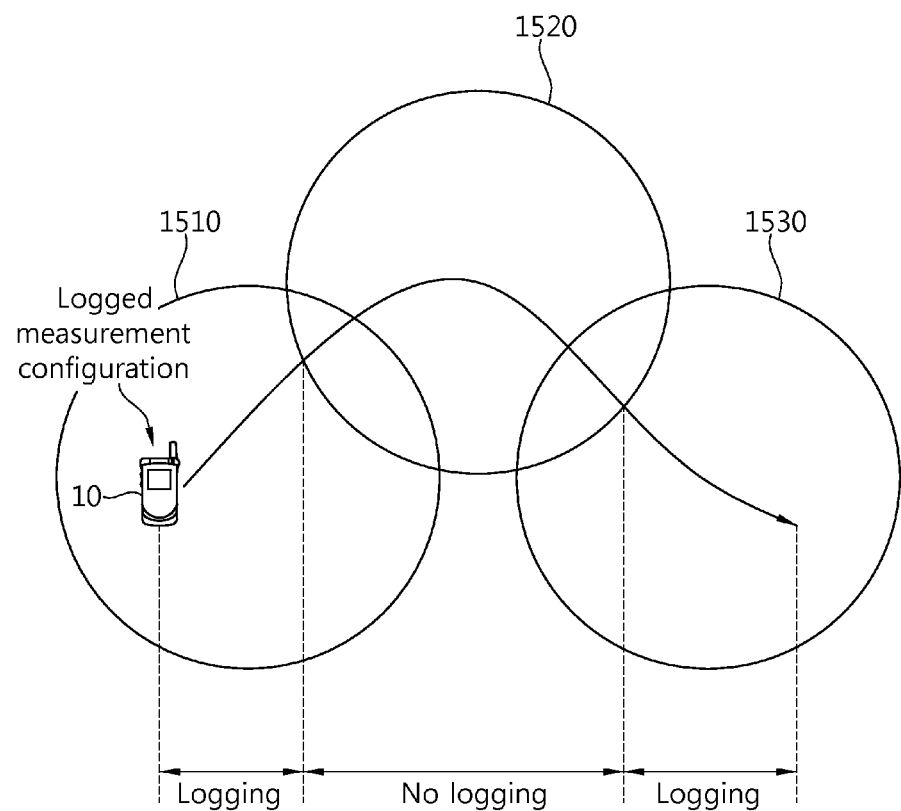
FIG. 15 is a diagram showing an example of logged MDT measurement according to a logging area.

FIG. 15 is a diagram showing an example of a logged MDT according to a logging area.

A network may configure a logging area that is an area in which UE has to log. The logging area may be represented as a cell list or a tracking area/location area list. If a logging area is configured in UE, the UE suspends logging when the UE gets out of the logging area.

Referring to FIG. 15, a first area 1510 and a third area 1530 are areas configured as logging areas, and a second area 1520 is an area in which logging is not permitted. UE performs logging in the first area 1510, but does not perform logging in the second area 1520. UE performs logging again when the UE moves from the second area 1520 to the third area 1530.

Figure 16:
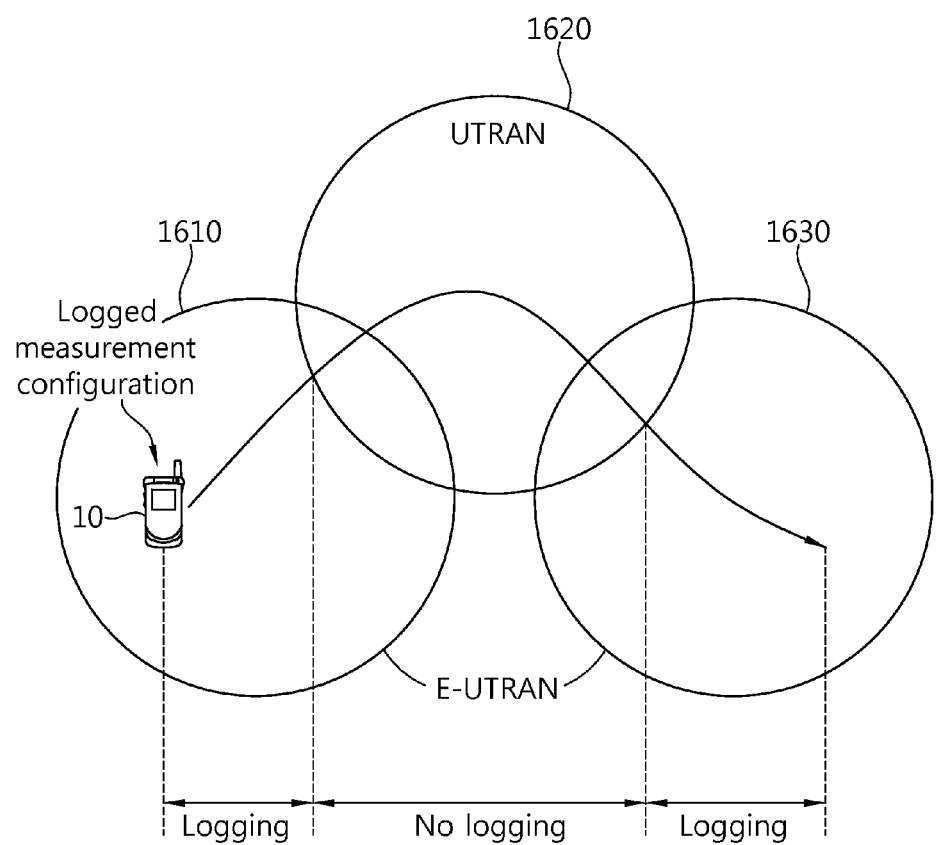
FIG. 16 is a diagram showing an example of logged MDT measurement according to a change of RAT.

FIG. 16 is a diagram showing an example of a logged MDT according to a change of RAT.

UE performs logging only when the UE camps on RAT from which a logged measurement configuration has been received and suspends logging in another RAT. However, the UE may log cell information about other RATs in addition to camp-on RAT.

A first area 1610 and a third area 1630 are E-UTRAN areas, and a second area 1620 is a UTRAN area. A logged measurement configuration is received from the E-UTRAN. When UE enters the second area 1620, the UE does not perform MDT measurement.

Referring back to FIG. 14, the UE enters the RRC_connected state (S1431). If logged measurement to be reported is present, the UE informs an eNB that the logged measurement to be reported is present (S1432). The UE may inform the eNB that the logged measurement is present when an RRC connection is established, an RRC connection is reestablished, or an RRC connection is reconfigured. Furthermore, if the UE performs handover, the UE may inform a handover target cell of a presence of the logged measurement. Informing, by the UE, the eNB that the logged measurement is present may include including a logged measurement-available indicator, that is, indication information informing that the logged measurement is present, in an RRC message transmitted from the UE to the eNB and sending the RRC message. The RRC message may be an RRC connection configuration complete message, an RRC connection reestablishment complete message, an RRC reconfiguration complete message, or a handover complete message.

When the eNB receives a signal informing that the logged measurement is present from the UE, the eNB request the UE to report logged measurement (S1433). Requesting the report on the logged measurement may include including a logged measurement report request parameter regarding information indicative of the request in an RRC message and sending the RRC message. The RRC message may be a UE information request message.

When the UE receives the request to report the logged measurement from the eNB, the UE reports the logged measurement to the eNB (S1434). Reporting the logged measurement to the eNB may include including the logged measurement report, including pieces of logged measurement, in an RRC message and sending the RRC message to the eNB. The RRC message may be a UE information report message. In reporting the logged measurement, the UE may report all or some of pieces of logged measurement owned by the UE on a report time point to the eNB. If the UE reports some of pieces of logged measurement, the reported pieces of logged measurement may be discarded.

A phase of a process in which the UE informs the eNB that the logged measurement is present, receives a request to report the logged measurement from the eNB, and reports the logged measurement is performed as described above is called a report phase.

A radio environment is chiefly measured by the UE while a logged MDT is performed. MDT measurement may include a cell identity and the signal quality and/or signal intensity of the cell. MDT measurement may include a measurement time and a measurement place. The following table illustrates contents logged by UE.

TABLE 2

| Parameter (set) | Contents |
| --- | --- |
| Serving cell identity | Global cell identity of a serving cell |
| Measurement result of serving cell | Measured RSRP of serving cell<br>Measured RSRQ of serving cell |
| Measurement result of neighbor cell | Cell identities of measured E-UTRA cells,<br>Measurement results of UTRA cells<br>Cell identities of measured UTRA cells,<br>Measurement results of UTRA cells<br>Cell identities of measured GERAN cells,<br>Measurement results of GERAN cells<br>Cell identities of measured CDMA2000 cells,<br>Measurement results of CDMA200 cells |

TABLE 2-continued

| Parameter (set) | Contents |
| --- | --- |
| Time stamp | Time of logging measurement result, calculated (current time-reference time), calculated in seconds |
| Location information | Detailed location information of logging time point |

Information logged at different logging time points can be classified and stored according to different log entries.

Figure 17:
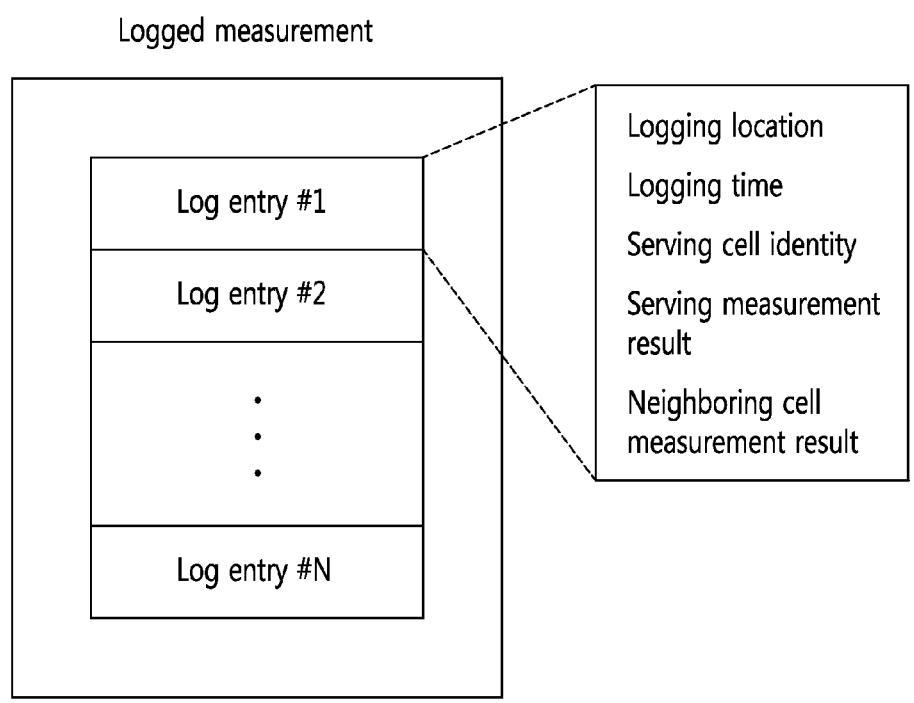
FIG. 17 is a diagram showing an example of logged measurement.

FIG. 17 is a diagram showing an example of logged measurement.

Logged measurement includes one or more log entries.

The log entry includes a logging location, a logging time, a serving cell identity, a serving cell measurement result, and a neighboring cell measurement result.

The logging location indicates the location where UE has performed measurement. The logging time indicates the time when UE has performed measurement. Pieces of information logged at different logging times are stored in different log entries.

The serving cell identity may include a cell identity in the layer 3, which is called a Global Cell Identity (GCI). The GCI is a set of a Physical Cell Identity (PCI) and a PLMN identity.

Meanwhile, UE may perform logging by analyzing criteria related to the performance of UE in addition to a radio environment. For example, the criteria related to the performance of UE may include a throughput, an erroneous transmission/reception rate, etc.

Referring back to FIG. 14, the aforementioned logging phase and report phase may be present in plural times for logging duration (S1441, S1442).

The eNB may record/store the logged measurement on/in a TCE when the logged measurement is reported.

If the UE has logged measurement that has not been reported after the validity timer expires, that is, after the logging duration elapses, the UE performs a procedure for reporting the logged measurement to the eNB. A phase in which the overall procedure for the procedure is called a post-reporting phase.

When the logging duration expires, the UE discards the logged measurement configuration and initiates a conservation timer. After the logging duration is terminated, the UE suspends MDT measurement. However, the already logged measurement remains intact without being discarded. The conservation timer indicates the lifetime of the remaining logged measurement.

When the UE enters the RRC_connected state (S1451) before the conservation timer expires, the UE may report logged measurement to the eNB. In this case, the aforementioned procedure for a logged measurement report may be performed (S1452, S1453, S1454). When the conservation timer expires, the remaining logged measurement may be discarded. When the logged measurement is reported, the eNB may record/store the logged measurement on/in the TCE.

The conservation timer may be fixed to a predetermined value in the UE and may be previously set in the UE. For example, a value of the conservation timer may be 48 hours. Or, a value of the conservation timer may be included in the logged measurement configuration and transferred to the UE or may be included in a different RRC message and transferred to the UE.

Meanwhile, when a new logged measurement configuration is transferred to the UE, the UE may update an existing logged measurement configuration into the newly obtained logged measurement configuration. In this case, the validity timer can be started again from the time when the logged measurement configuration is newly received. Furthermore, logged measurement based on the previous logged measurement configuration may be discarded.

Figure 18:
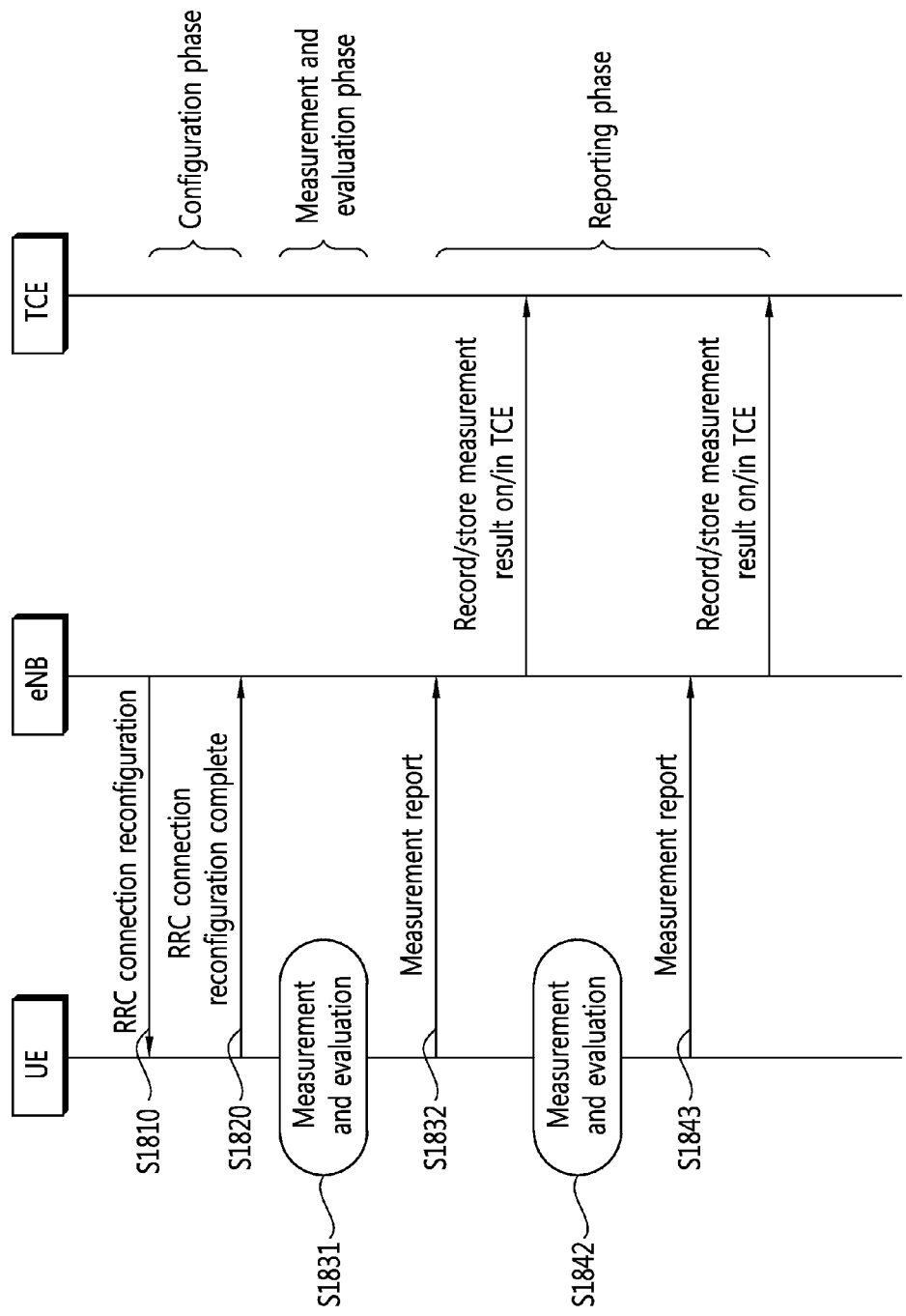
FIG. 18 is a diagram showing an example of an immediate MDT.

FIG. 18 is a diagram showing an example of an immediate MDT. The immediate MDT is based on a Radio Resource Management (RRM) measurement and report mechanism. In addition, information related to the location upon a measurement report is added and reported to an eNB.

Referring to FIG. 18, UE receives an RRC connection reconfiguration message (S1810) and transmits an RRC connection reconfiguration complete message (S1820). Thus, the UE enters the RRC_connected state. The UE may receive a measurement configuration by receiving the RRC connection reconfiguration message. In the example of FIG. 18, the measurement configuration has been illustrated as being received through the RRC connection reconfiguration message, but the measurement configuration may be included in a different RRC message and transmitted.

The UE performs measurement and evaluation in the RRC_connected state (S1831) and reports a measurement result to the eNB (S1832). In the immediate MDT, the measurement result may provide precise location information, as possible, as in the example of location information provided by a Global Navigation Satellite System (GNSS). For location measurement, such as an RF fingerprint, the measurement result may provide measurement information about a neighboring cell, which may be used to determine the location of UE.

From FIG. 18, it may be seen that even after the executed measurement and evaluation (S1831) and the report (S1832), the UE reports a measurement result (S1843) to the eNB right after performing measurement and evaluation (S1842). This is the biggest difference between the logged MDT and the immediate MDT.

In-Device Coexistence (IDC) is described below.

In order for a user to access various networks anywhere and at any time, UE can be equipped with a Global Navigation Satellite System (GNSS) receiver in addition to a transceiver for wireless communication systems, such as LTE, Wi-Fi, and Bluetooth (BT). For example, there may be UE on which LTE and BT modules are mounted in order to receive VoIP service and multimedia service using BT equipment, UE on which LTE and Wi-Fi modules are mounted for a traffic distribution, UE on which GNSS and LTE modules are mounted in order to additionally receive location information.

Figure 19:
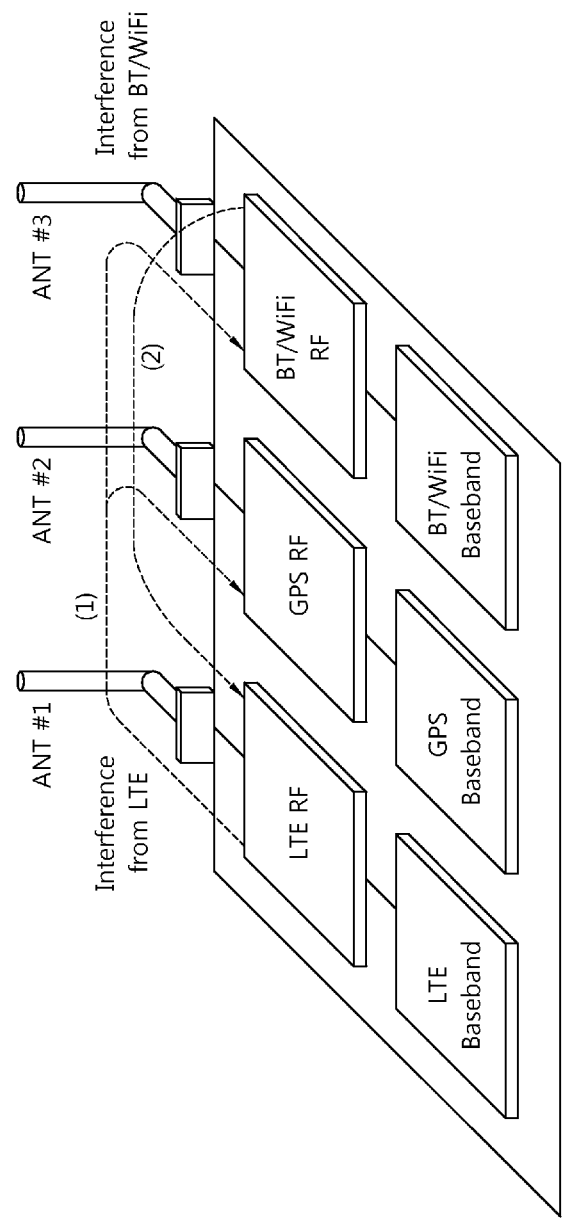
FIG. 19 shows a situation in which mutual interference can be generated in an IDC environment in which LTE, GPS, and BT/Wi-Fi coexist within a piece of UE.

In this case, since several transceivers are closely located within the UE, the intensity of power transmitted by one transmitter can be greater than the reception power of another receiver. Interference between two transceivers (IDC interference) can be prevented by placing a gap in filter technology or a use frequency. However, if several wireless communication modules operate in neighboring frequencies within a piece of UE, interference cannot be sufficiently removed by current filter technology. In the future, for the coexistence of transceivers for a plurality of wireless communication modules within UE, the above problem needs to be solved. FIG. 19 shows a situation in which mutual interference can be generated in an IDC environment in which LTE, GPS, and BT/Wi-Fi coexist within a piece of UE.

IDC interference avoidance is basically classified into three types of modes depending on whether coordination with another communication module coexisting with an LTE module is present or not and whether coordination with an LTE module and a BS is present or not in order to solve IDC interference. The first is a mode in which no coordination is present for IDC interference avoidance between coexistence communication modules and LTE and a network. In this case, the deterioration of service quality attributable to IDC interference may not be properly processed because the LTE module is unaware of information about another communication module that coexists along with the LTE module. The second mode is a case where coordination between coexistence communication modules is present within UE. In this mode, an on/off state, a traffic transmission state, etc. for a counterpart module can be aware between coexisting modules. In this mode, however, there is no coordination between the UE and a network. The final mode is a mode in which there is no coordination within UE between the UE and a network as well as coordination between coexistence modules. In this mode, a coexisting module can be aware of an on/off state, a traffic transmission state, etc. for a counterpart module, and UE informs a network of an IDC interference state. Accordingly, the network makes a determination and takes measures for avoiding IDC interference.

As described above, an LTE module can measure IDC interference through inter/intra frequency measurement as well as coordination with other modules within UE.

Interference can be IDC interference generated because different communication modules coexist and operate within a piece of UE, and the IDC interference can be generated in the following coexistence situation.

Interference is generated in a situation in which LTE and Wi-Fi coexist.

Interference is generated in a situation in which LTE and BT coexist.

Interference is generated in a situation in which LTE and GNSS coexist.

Communication modules influence mutual interference because they operate neighboring frequencies as follows in terms of the frequency.

LTE TDD can operate in a Band 40 (2300 MHz to 2400 MHz), and Wi-Fi and BT can operate in an unlicensed band (2400 MHz to 2483.5 MHz). In this case, the transmission of LTE can give interference with Wi-Fi and BT, and the transmission of Wi-Fi or BT can give interference with the reception of LTE.

In LTE FDD, uplink transmission can be performed in a Band 7 (2500 MHz to 2700 MHz), and Wi-Fi and Bluetooth can operate in an unlicensed band (2400 MHz to 2483.5 MHz). In this case, the uplink transmission of LTE can give interference with the reception of Wi-Fi or Bluetooth.

In LTE FDD, uplink transmission can be performed in a Band 13 (UL: 777 to 787 MHz, DL: 746 to 756 MHz) or Band 14 (UL: 788 to 798 MHz, DL: 758 to 768 MHz), and in GPS radio, reception can be performed in 1575.42 MHz. In this case, the uplink transmission of LTE can give interference with the reception of a GPS.

In current 3GPP, three directions are being discussed in order to solve IDC interference. The first is a method in which a communication module that provides interference or a communication module that is subject to interference changes its frequency (Frequency Division Multiplexing (FDM)). The second is a method in which a communication module using a coexisting frequency splits and uses the time (Time Division Multiplexing (TDM)). The last is a method in which an LTE module reduces interference that affects a coexisting module by controlling its transmission power (LTE Power control (PC)). A detailed method and procedure are being discussed in 3GPP.

Since IDC interference is interference generated within UE, an LTE BS is unaware that the IDC interference generated within the UE is in what situation. If a network can obtain information about an IDC interference situation generated within UE, the network may provide the UE with means that enables the UE to effectively avoid the IDC interference based on the information. There is proposed a method in which UE logs information about IDC interference generated within the UE and reporting the information to a network. Another communication module that may generate interference with a module which supports wireless communication, such as LTE, is hereinafter called an in-device. Interference generated by an in-device and/or interference caused by an in-device is hereinafter called IDC interference.

Figure 20:
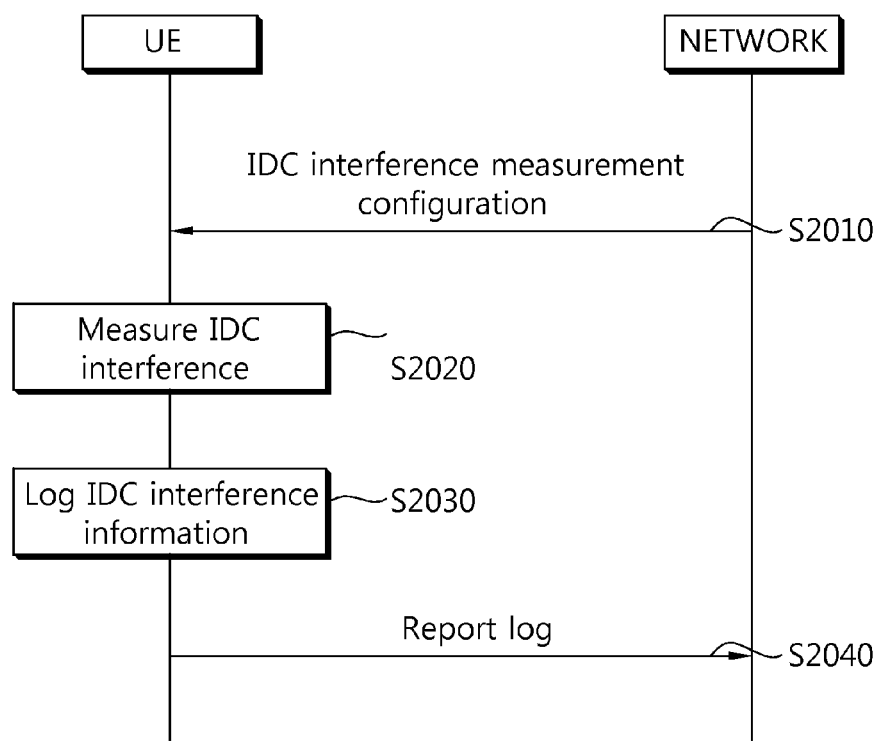
FIG. 20 is a flowchart illustrating a method for logging IDC interference information and reporting the log in accordance with an embodiment of the present invention.

FIG. 20 is a flowchart illustrating a method for logging IDC interference information and reporting the log in accordance with an embodiment of the present invention. FIG. 20 illustrates a method for logging IDC interference information and reporting a corresponding log to a network when a specific condition is satisfied.

Referring to FIG. 20, UE receives an IDC interference measurement configuration from a network (S2010). The IDC interference measurement configuration includes a logging start indicator that instructs the UE to start IDC interference measurement.

The UE measures IDC interference in order to log IDC interference information (S2020). The IDC interference information logged by the UE may include information about an IDC interference situation and/or IDC operation information related to the operation of an in-device.

The information about an IDC interference situation may include IDC interference caused by an in-device and IDC interference affecting the in-device. Accordingly, the UE can measure IDC interference caused by the in-device and IDC interference affecting the in-device.

In order to log the information about an IDC interference situation, the UE measures IDC interference caused by an in-device. The measurement of the IDC interference attributable to the in-device by the UE may be performed as follows.

A measurement mode 1: the UE calculates a measurement result by measuring an LTE subframe including interference due to an in-device.

A measurement mode 2: the UE calculates a measurement result by measuring the remaining LTE subframes other than the LTE subframe including interference due to an in-device.

A measurement mode 3: the measurement result calculated using the measurement mode 1 and the measurement result calculated using the measurement mode 2 are calculated.

A measurement mode 4: a difference between the measurement result calculated using the measurement mode 1 and the measurement result calculated using the measurement mode 2 is calculated.

The UE may be configured to perform measurement using a predetermined and specific measurement mode of the measurement modes. Or, a network may indicate a measurement mode to be used when the UE measures IDC interference attributable to an in-device. Information indicative of the measurement mode may be included in an IDC interference measurement configuration and transmitted.

Additionally, the UE may have a time interval in which interference will be measured through a specific measurement mode configured by a network and may measure interference through the specific measurement mode in the corresponding time interval. In this case, information about the time interval in which the specific measurement mode is used may be included in an IDC interference measurement configuration and transmitted.

The UE can be aware of a subframe including interference and a subframe not including interference prior to measurement. The UE can obtain information regarding how the transmission and reception operations of radio signals are performed by an in-device and how the transmission and reception operations of radio signals are scheduled because an LTE module and an in-device coexist within the UE. Accordingly, the UE can be aware that IDC interference affecting an LTE module due to the transmission and reception of radio signals of the in-device is present in what subframe. Accordingly, a subframe corresponding to timing at which IDC interference may be generated can be assumed to be a subframe including interference, and the remaining subframes may be assumed to be subframes not including interference. Meanwhile, the UE may use the following conditions in determining that IDC interference attributable to an in-device can be generated in a specific subframe.

A condition 1: the transmission power of an in-device exceeds a threshold

A condition 2: the transmission of an in-device is generated at specific timing (e.g., when in-device transmission is generated at subframe timing at which a reference signal for measuring the quality of an LTE serving cell is generated)

A condition 3: when frequency in which the condition 2 is generated is a specific threshold or higher (e.g., when a ratio of in-device transmission during subframe timing used for LTE serving cell measurement is a specific threshold or higher during a specific time interval)

A condition 4: when a decoding failure rate of an LTE reception signal exceeds a specific threshold A condition 5: one combination of at least one among the condition 1 to the condition 4, and when conditions used in the combination are satisfied at the same time (e.g., when both the condition 1 and the condition 2 are satisfied. That is, in-device transmission is generated at subframe timing at which a reference signal for measuring LTE serving cell quality is generated, and in-device transmission power exceeds the threshold)

Which one of the conditions will be used may be configured in the UE in advance. The UE can be aware of a subframe in which IDC interference attributable to an in-device may be present according to a predetermined condition.

Or, a network may indicate a condition that becomes a base on which the UE determines whether or not IDC interference attributable to an in-device can be present. In this case, information indicative of a specific condition may be included in an IDC interference measurement configuration and transmitted.

In order to log information about an IDC interference situation, the UE measures IDC interference that affects an in-device due to LTE. The UE may measure IDC interference that affects the in-device as follows.

A measurement mode 1: the UE calculates a measurement result by measuring an LTE subframe including interference that affects an in-device.

A measurement mode 2: the UE calculates a measurement result by measuring LTE subframes other than the LTE subframe including interference that affects an in-device.

A measurement mode 3: the UE calculates the measurement result calculated through the measurement method 1 and the measurement result calculated through the measurement method 2.

A measurement mode 4: the UE calculates a difference between the measurement result calculated through the measurement method 1 and the measurement result calculated through the measurement method 2.

The UE may be configured to perform measurement according to a predetermined and specific measurement mode of the measurement modes. Or, a network may indicate a measurement mode to be used when the UE measures IDC interference that affects an in-device. Information indicative of the measurement mode may be included in an IDC interference measurement configuration and transmitted.

Additionally, the UE may have a time interval in which interference will be measured through a specific measurement mode and a time pattern used in interference measurement configured by a network and measure interference through the specific measurement mode in the corresponding time interval or time pattern. In this case, information about the time interval in which the specific measurement mode is used may be included in an IDC interference measurement configuration and transmitted.

The UE may be aware of a subframe including interference and a subframe not including interference prior to measurement. The UE may be aware of scheduling information about when a radio signal will be transmitted through an LTE module. Accordingly, the UE can be aware of a subframe having a possibility that IDC interference attributable to the transmission and reception of radio signals of the LTE module will affect an in-device. Accordingly, a subframe in which IDC interference can be generated may be assumed to be a subframe including interference, and the remaining subframes may be assumed to be subframes not including interference. The UE may use the following conditions in determining whether IDC interference affecting an in-device is present or not. The UE may use the following conditions in determining that IDC interference affecting an in-device may be generated in a specific subframe.

A condition 1: LTE transmission power exceeds a threshold

A condition 2: the transmission of an UE LTE device is generated at important specific timing in order to maintain an in-device operation (e.g., when UE LTE transmission is generated at channel timing for the synchronization of an in-device)

A condition 3: when frequency that the condition 2 is generated is a threshold or higher (e.g., when a timing ratio in which UE LTE transmission is generated, from channel timing for the synchronization of an in-device, is a threshold or higher during a specific time interval)

A condition 4: a decoding failure rate of an in-device reception signal exceeds a threshold A condition 5: a combination of at least one among the condition 1 to the condition 4, and when conditions used in the combination are satisfied at the same time.

Which one of the conditions will be used may be configured in the UE in advance. The UE can be aware of a subframe in which IDC interference affecting an in-device may be present according to a predetermined condition.

Or, a network can indicate a condition that becomes a base on which the UE determines whether or not IDC interference affecting an in-device can be present. In this case, information indicative of a specific condition can be included in an IDC interference measurement configuration and transmitted.

The UE logs IDC interference information (S2030).

The UE may log IDC interference situation information which includes a measurement result of IDC interference due to an in-device and/or a measurement result of IDC interference that affects the in-device.

When logging the IDC interference measurement results, timing used in measurement for obtaining the measurement results may be logged. The timing may be the timing of an LTE subframe unit. Timing information may be used for a BS to check a specific LTE subframe or specific LTE subframe pattern having high IDC interference based on the timing information. Or, the timing information may be used as reference information for checking a specific LTE subframe or specific LTE subframe pattern having low IDC interference.

In logging IDC interference information, the UE may log IDC operation information related to the operation of an in-device. The IDC operation information may indicate an event related to the operation of an in-device, and the event can include the following events.

An event 1a: an in-device is enabled. According to embodiments, the enabled state of the in-device may mean that a connection with the object to and from which the in-device will transmit and receive information is established or a state in which a preparation for the transmission and reception of information to and from the object has been completed. The enabled state of the in-device can mean a state in which the in-device is turned on.

An event 2b: an in-device is disabled.
An event 2a: the transmission of an in-device is started
An event 2b: the transmission of an in-device is suspended
An event 3a: the reception of an in-device is started
An event 3b: the reception of an in-device is suspended The UE may log the IDC interference situation information and the IDC interference operation information at the same time. Or, the UE may log the IDC interference situation information and the IDC interference operation information independently.

Information indicating that logged specific IDC interference information is about what in-device may be included. To this end, the UE may include an identity indicative of the in-device in the IDC interference information.

The UE may log information about the location of the UE at a point of time at which IDC interference information is logged by logging the corresponding IDC interference information.

The UE may log information indicative of a point of time at which IDC interference information is logged by logging the corresponding IDC interference information.

The UE reports the log to a network (S2040).

The UE may log the IDC interference information for a specific period and report the log to the network at a specific point of time, in the same manner that the UE reports logged measurement according to a logged MDT. In this case, when a log report request is received from network, the UE may report the log to the network in response to the log report request.

A period in which the UE logs the IDC interference information may be set. The logging period may be specified to a specific number of subframes or may be specified to a specific number of radio frames or a specific time interval. For example, if the logging period is given as 40 subframes, the UE may obtain and log IDC interference information about each of interference subframes within the 40-subframe interval. After the 40-subframe interval elapses, the UE may report a log to the network. Information about the logging period may be included in an IDC interference measurement configuration.

The UE may immediately report a log to the network when logging individual IDC interference information in the same manner that the UE reports a measurement result according to an immediate MDT to a network.

The UE may include information indicating that an in-device log is related to what in-device, that is, an identity indicative of a related specific in-device.

Meanwhile, when the UE reports the log to the network, the UE may control and/or delay report timing in order to use an LTE subframe having small interference from an in-device and/or in order to report a log at timing at which interference affecting the in-device is generated.

In the IDC interference information logging and log reporting method of FIG. 20, an in-device is a device placed such that it coexists with the same physical device as an LTE transmission and reception device, and the in-device means a device that causes IDC interference attributable to the in-device due to the distance close to the LTE transmission and reception device and/or a device that gives IDC interference to the in-device.

An in-device may be a BT-supporting device based on IEEE 802.15.1.

An in-device may be a Zigbee-supporting device based on IEEE 802.15.4.

An in-device may be a Wi-Fi-supporting device based on IEEE 802.11.

An in-device may be a WiMax-supporting device based on IEEE 802.16.

Figure 21:
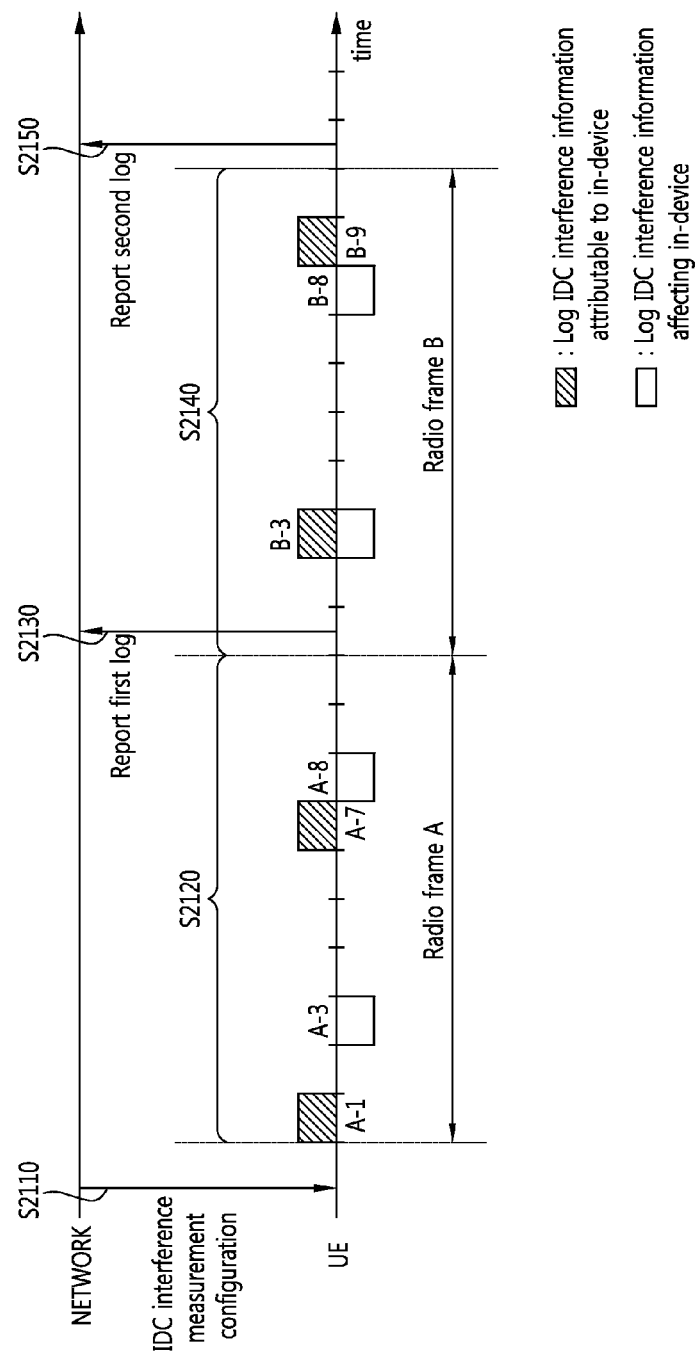
FIG. 21 is a diagram showing an example of a method of logging interference information and reporting the log in an IDC environment to which an embodiment of the present invention has been applied.

FIG. 21 is a diagram showing an example of a method of logging interference information and reporting a log in an IDC environment to which an embodiment of the present invention has been applied.

Referring to FIG. 21, UE receives an IDC interference measurement configuration from a network (S2110). The IDC interference measurement configuration may include the information described with reference to FIG. 20. In this example, it is assumed that the interference measurement configuration includes information indicating the logging period of the UE using a 10-subframe interval, that is, one radio frame interval.

The UE performs IDC interference measurement and logs IDC interference information within a radio frame A interval (S2120). The UE performs IDC interference measurement on subframes A-1 and A-7 in which IDC interference attributable to an in-device can be generated and the subframes A-7 and A-8 in which IDC interference affecting the in-device may be generated. Furthermore, the UE performs IDC interference measurement on each of the subframes and logs IDC interference information about each of the subframes. The logged IDC interference information may include the pieces of information described with reference to FIG. 20.

The UE reports the measurement performed within the radio frame A interval and a first log according to a logging procedure to the network (S2130). In this figure, the report has been illustrated as being performed to the network immediately after a lapse of the radio frame A interval, but timing for the log report may be controlled and/or delayed. Furthermore, to report the log to the network can be performed in response to a log request from the network.

The UE performs IDC interference measurement and logs IDC interference information within a radio frame B interval (S2130). The UE performs IDC interference measurement on subframes B-3, B-8, and B-9 in which IDC interference attributable to an in-device and/or IDC interference affecting the in-device can be generated. Furthermore, after performing IDC interference measurement on each of the subframes, the UE logs IDC interference information. The logged IDC interference information includes the pieces of information described with reference to FIG. 20.

The UE reports the measurement performed within the radio frame B interval and a second log according to a logging procedure to the network (S2140). In this figure, the report has been illustrated as being performed to the network immediately after a lapse of the radio frame B interval, but timing for the log report may be controlled and/or delayed. Furthermore, to report the log to the network may be performed in response to a log request from the network.

FIG. 21 shows an example of an IDC interference information logging and log reporting method based on a non-realtime log report. Unlike in FIG. 21, in the case of a real-time log report, a log may be reported to the network right after IDC interference is measured and IDC interference information is logged in each subframe.

In accordance with the present invention, UE can effectively log an in-device interference situation and operation situation and report the log to a network. The network can perform a configuration for minimizing in-device interference for the UE in the UE because it can obtain information about the pattern of a subframe in which interference can be generated by analyzing the log. Accordingly, service efficiency and radio resources efficiency of IDC UE can be improved.

Figure 22:
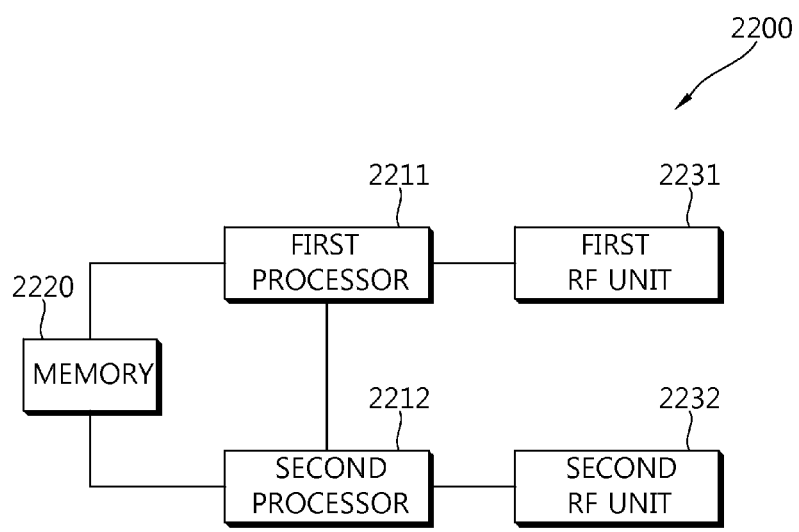
FIG. 22 is a block diagram showing a radio device in which an embodiment of the present invention can be implemented.

FIG. 22 is a block diagram showing a radio device in which an embodiment of the present invention can be implemented. The device can implement the operation of UE in the embodiments of FIGS. 19 to 21.

The radio device 2200 includes a first processor 2211, a second processor 2212, memory 2220, a first Radio Frequency (RF) unit 2231, and a second RF unit 2232.

The first RF unit 2231 is configured to transmit and receive the radio signals of an LTE wireless communication system. The first processor 2211 is configured to perform LTE wireless communication while functionally operating in conjunction with the first RF unit.

The second RF unit 2231 is configured to transmit and receive the radio signals of wireless communication systems, such as Wi-Fi, WiMAX, Zigbee, and BT. The second processor 2212 operates while functionally operating in conjunction with the second RF unit, and it is configured to perform the wireless communication of a wireless communication system corresponding to the second RF unit.

The first processor 2211 performs the proposed functions, processes and/or methods. The first processor 2211 measures IDC interference for a subframe in which in-device interference can be generated due to the second RF unit 2232 and the second processor 2212. The first processor 2211 can log IDC interference information in the memory 2220. The first processor 2211 is configured to report the log to a network. The embodiments of FIGS. 19 to 21 can be implemented by the first processor 2211 and the memory 2220.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing radio signals. When the above-described embodiment is implemented in software, the above-described scheme may be implemented into a module (process or function) configured to perform the above function. The module may be stored in the memory and executed by the processor. The memory may be placed inside or outside the processor and connected to the processor using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The invention claimed is:

1. A wireless apparatus comprising:
    a first Radio Frequency (RF) unit transmitting and receiving radio signals according to a first wireless communication system;
    a second RF unit transmitting and receiving radio signals according to a second wireless communication system; and
    a processor operably coupled to the first RF unit, wherein the processor is configured to:
        receive an In-Device Coexistence (IDC) interference measurement configuration from a network,
        perform first IDC interference measurement on a first subframe,
        log first IDC interference information comprising a first IDC interference measurement result,
        perform second IDC interference measurement on a second subframe,
        log second IDC interference information comprising a second IDC interference measurement result, and
        report the first IDC interference information and the second IDC interference information to the network,
        wherein the IDC interference measurement configuration comprises:
            information instructing that a logging of IDC interference information be started, and
            information indicative of a log report type.

2. The wireless apparatus of claim 1, wherein if the log report type indicates a non-real-time log report type, the first IDC interference information and the second IDC interference information are together reported to the network after a specific point of time.

3. The wireless apparatus of claim 2, wherein the IDC interference measurement configuration further comprises logging interval indication information indicative of the specific point of time.

4. The wireless apparatus of claim 3, wherein the reporting the first IDC interference information and the second IDC interference information to the network comprises:
    receiving a log report request from the network, and
    sending the first IDC interference information and the second IDC interference information to the network in response to the log report request.

5. The wireless apparatus of claim 1, wherein if the log report type indicates a real-time log report type, the first IDC interference information and the second IDC interference information are individually logged and individually reported to the network.

6. The wireless apparatus of claim 1, wherein the first IDC interference information further comprises information about timing of the first IDC interference measurement.

7. The wireless apparatus of claim 6, wherein the information about the timing of the first IDC interference measurement is timing information of a subframe unit.

8. The wireless apparatus of claim 1, wherein the first RF unit and the processor support Long Term Evolution (LTE) wireless communication.

9. The wireless apparatus of claim 1, wherein the second RF unit supports at least one of WLAN (Wi-Fi), WiMAX, Zigbee, and Bluetooth wireless communications.

10. A method for logging and reporting In-Device Coexistence (IDC) interference information, performed by IDC UE, in a wireless communication system, comprising:
    receiving an In-Device Coexistence (IDC) interference measurement configuration from a network,
    performing first IDC interference measurement on a first subframe, logging first IDC interference information comprising a first IDC interference measurement result, performing second IDC interference measurement on a second subframe, logging second IDC interference information comprising a second IDC interference measurement result, and reporting the first IDC interference information and the second IDC interference information to the network, wherein the IDC interference measurement configuration comprises:

information instructing that a logging of IDC interference information be started, and information indicative of a log report type.

11. The method of claim 10, wherein if the log report type indicates a non-real-time log report type, the first IDC interference information and the second IDC interference information are together reported to the network after a specific point of time.

12. The method of claim 11, wherein the IDC interference measurement configuration further comprises logging interval indication information indicative of the specific point of time.

13. The method of claim 12, wherein the step of reporting the first IDC interference information and the second IDC interference information to the network comprises:

receiving a log report request from the network, and sending the first IDC interference information and the second IDC interference information to the network in response to the log report request.

14. The method of claim 10, wherein if the log report type indicates a real-time log report type, the first IDC interference information and the second IDC interference information are individually logged and individually reported to the network.

15. The method of claim 10, wherein the first IDC interference information further comprises information about timing of the first IDC interference measurement.

* * * * *